(12) United States Patent
McNelley et al.

(10) Patent No.: US 6,481,851 B1
(45) Date of Patent: Nov. 19, 2002

(54) ADJUSTABLE CONTRAST REFLECTED DISPLAY SYSTEM

(75) Inventors: Steve H. McNelley, San Juan Capistrano, CA (US); Jeffrey S. Machtig, Lake Forest, CA (US)

(73) Assignee: Videotronic Systems, San Juan Capistrano, CA (US)

( * ) Notice: Subject to any disclaimer, the term of this patent is extended or adjusted under 35 U.S.C. 154(b) by 0 days.

(21) Appl. No.: 09/878,813

(22) Filed: Jun. 11, 2001

Related U.S. Application Data

(63) Continuation-in-part of application No. 09/777,145, filed on Feb. 5, 2001, which is a continuation of application No. 09/262,974, filed on May 5, 1999, now Pat. No. 6,243,130, which is a continuation-in-part of application No. 09/108,476, filed on Jul. 1, 1998, now Pat. No. 5,953,052, which is a continuation-in-part of application No. 08/530,880, filed on Sep. 20, 1995, now Pat. No. 5,777,665.

(51) Int. Cl.[7] ............ G03B 21/26; G09G 5/00; G02B 27/28; G02B 5/22; H04N 7/14
(52) U.S. Cl. ............... 353/28; 345/5; 345/7; 359/489; 359/493; 359/501; 359/630; 359/888; 359/890; 348/14.07; 348/14.1; 348/14.12
(58) Field of Search ............... 353/28; 345/4, 345/5, 7; 359/629, 630, 483, 489, 493, 501, 888, 890; 348/14.07, 14.1, 14.12, 20

(56) References Cited

U.S. PATENT DOCUMENTS

| | | | |
|---|---|---|---|
| 5,639,151 A | 6/1997 | McNelley et al. | 353/98 |
| 5,782,547 A | 7/1998 | Machtig et al. | 353/28 |
| 5,890,787 A * | 4/1999 | McNelley et al. | 353/28 |
| 5,923,469 A | 7/1999 | Machtig et al. | 359/451 |
| 6,042,235 A * | 3/2000 | Machtig et al. | 353/28 |
| 6,104,424 A * | 8/2000 | McNelley | 348/14.16 |
| 6,257,727 B1 * | 7/2001 | Melville | 353/28 |

OTHER PUBLICATIONS

Advertisement—Pronova Projektions Systeme entitled HoloPro™: Holographic Projection Screen for rear projection in daylight.
Advertisement—DNP—DNP Holo Screen Crystal Illusion.

* cited by examiner

Primary Examiner—Russell Adams
Assistant Examiner—Magda Cruz
(74) Attorney, Agent, or Firm—Crosby, Heafey, Roach & May LLP

(57) ABSTRACT

A transparent-reflective display constructed to be alterable so that reflected images are viewed upon a transparent surface that can alter to a darkened surface, thereby changing contrast of the reflection. An assembly consisting of a beamsplitter and an electronically adjustable contrast layer is constructed as a thin sheet and positioned to reflect an image source. The electronically adjustable contrast layer consists of a shuttering capable material, such as liquid crystal shutters and suspended particle devices, that can be electronically engaged to be in a transparent state and also a darkened (opaque) state. The electronically adjustable contrast layer enables images to been seen in a mode that best suits its video content as to the degree of contrast selected among the transparent to darkened states. An embodiment of the present invention synchronizes events in video content to one of the states of transparent, darkened and the increments between.

20 Claims, 22 Drawing Sheets

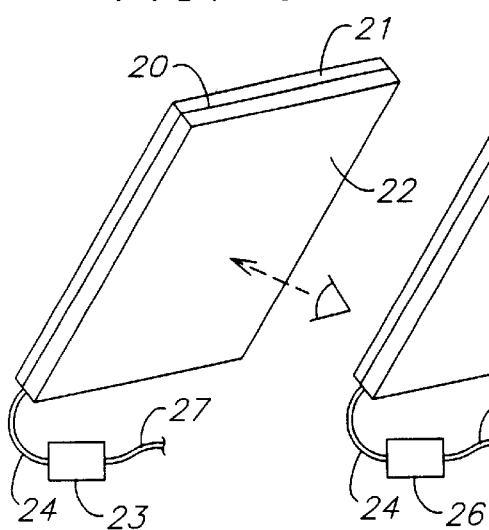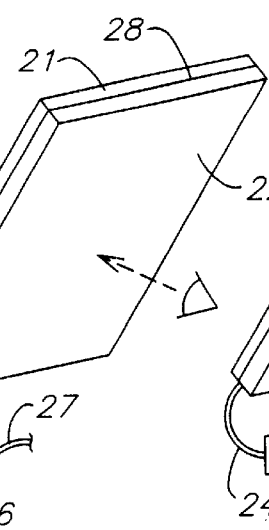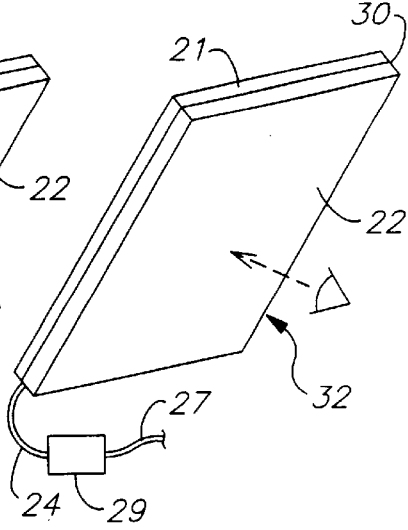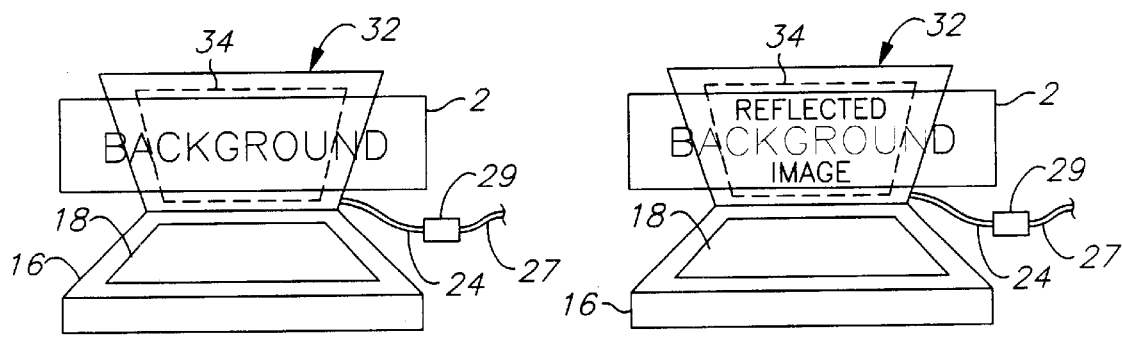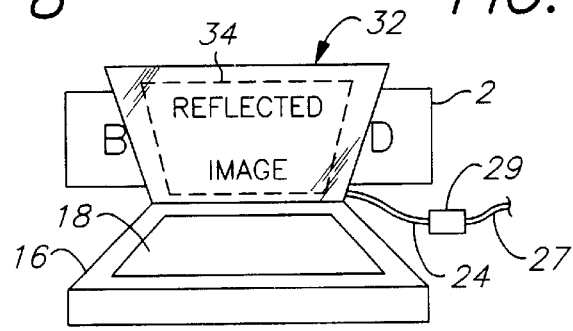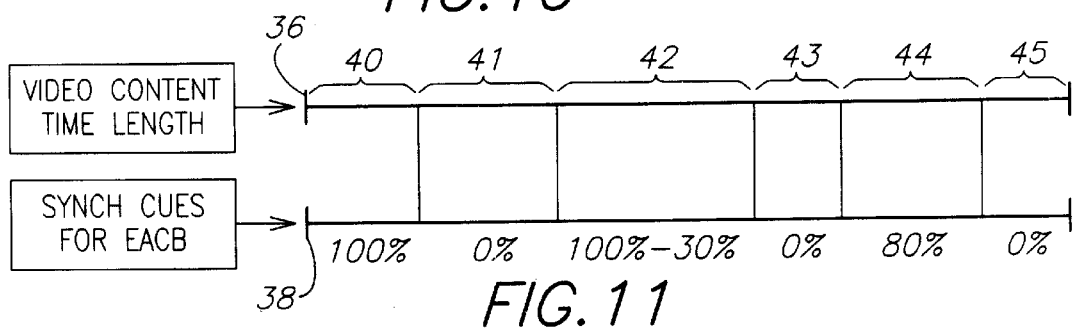

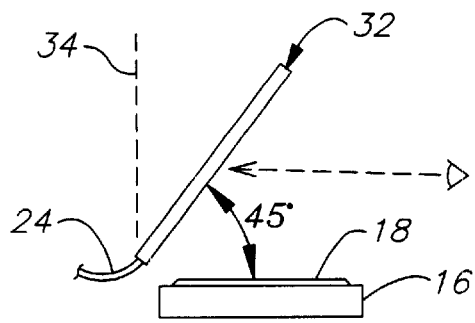
FIG. 16
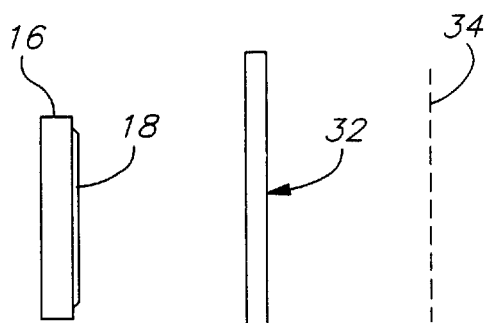
FIG. 17
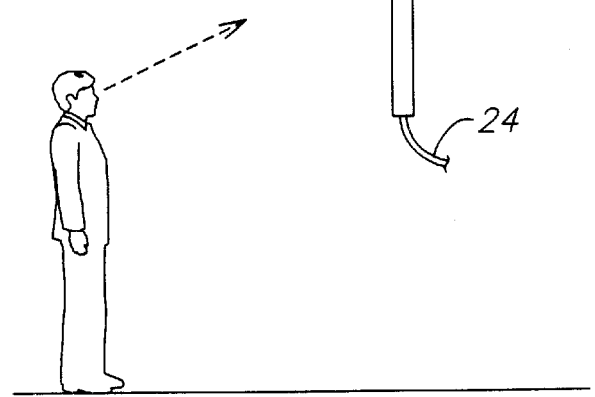
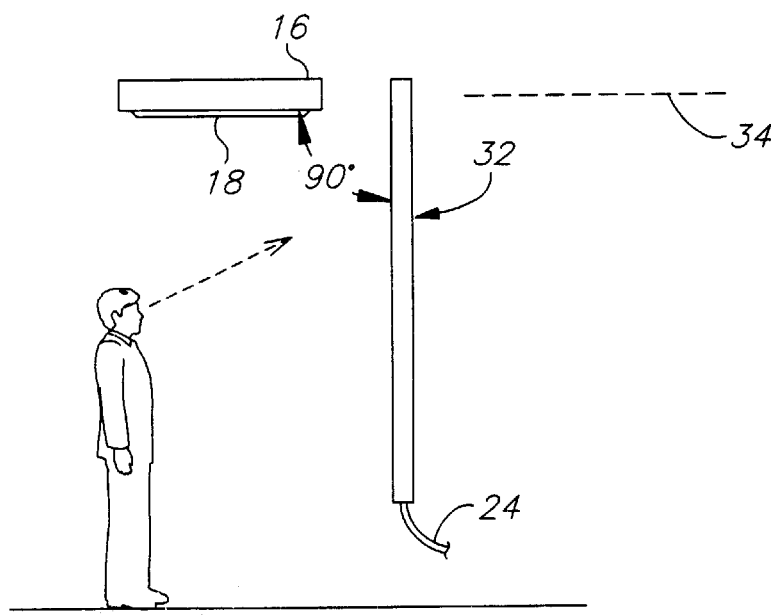
FIG. 18

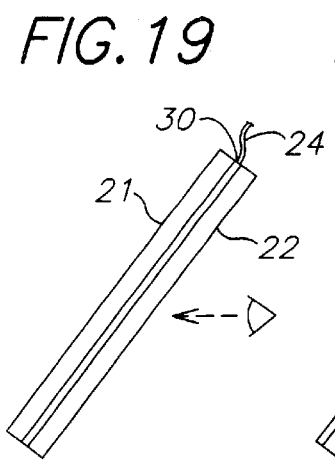
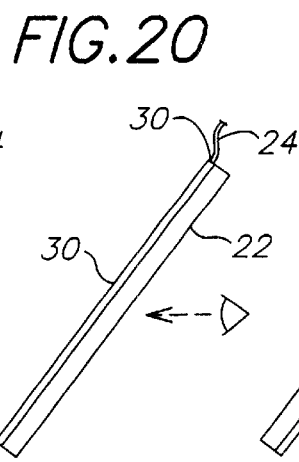
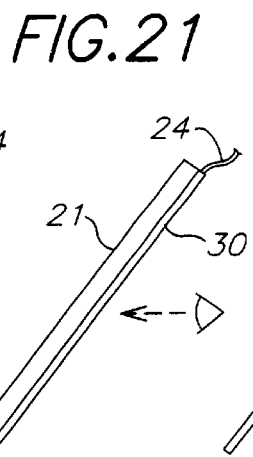
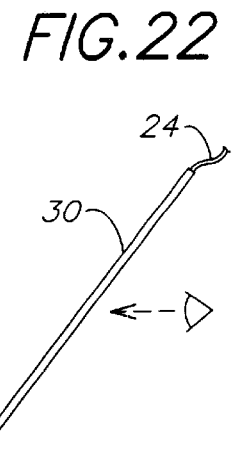
FIG.19  FIG.20  FIG.21  FIG.22
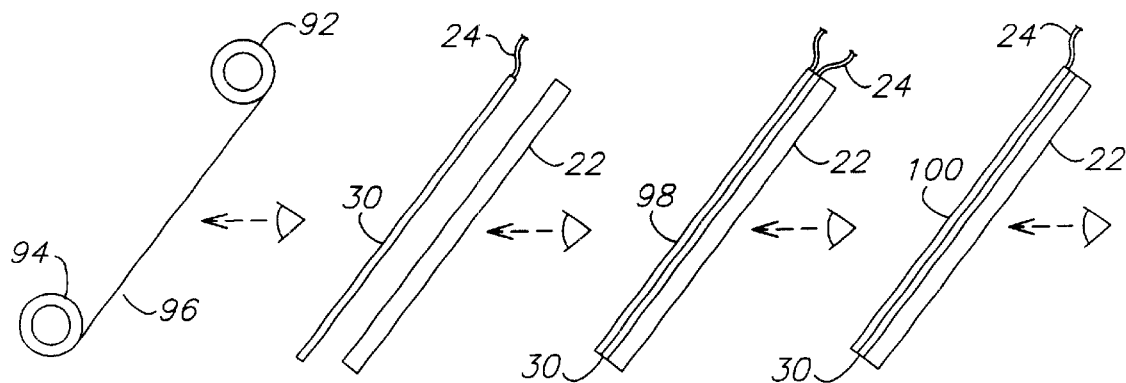
FIG.23  FIG.24  FIG.25  FIG.26
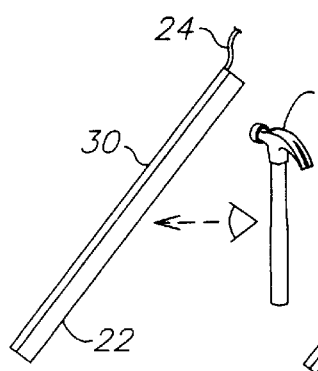
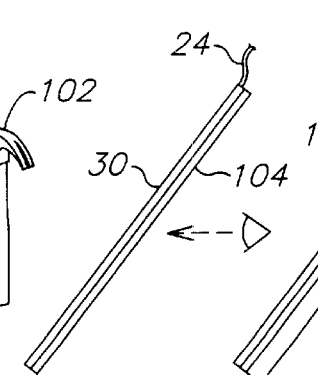
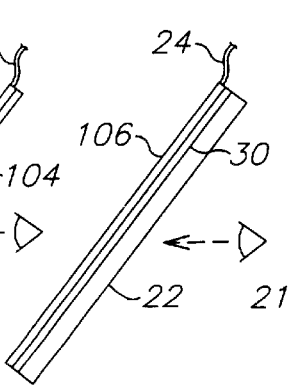
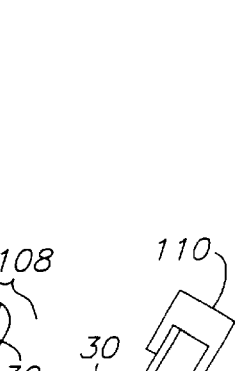
FIG.27  FIG.28  FIG.29
FIG.30  FIG.31

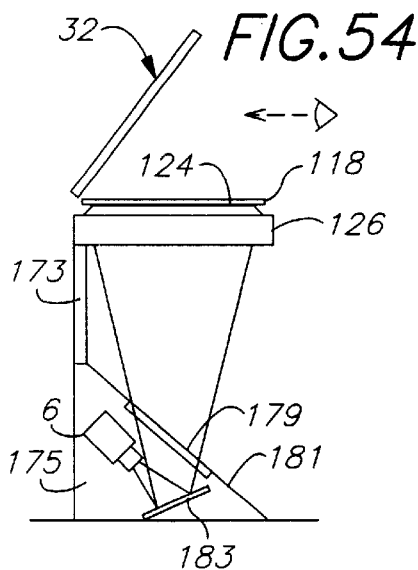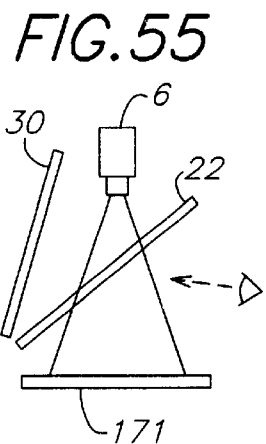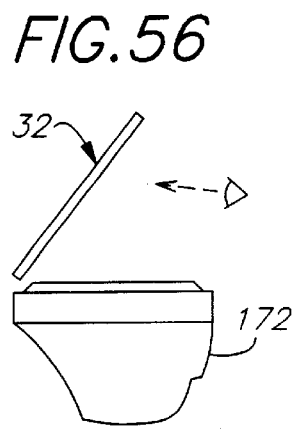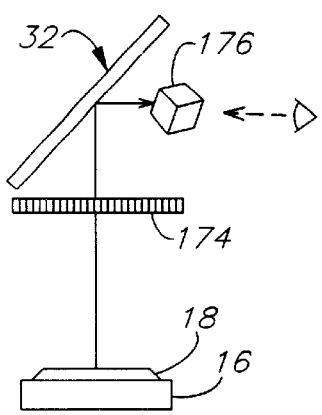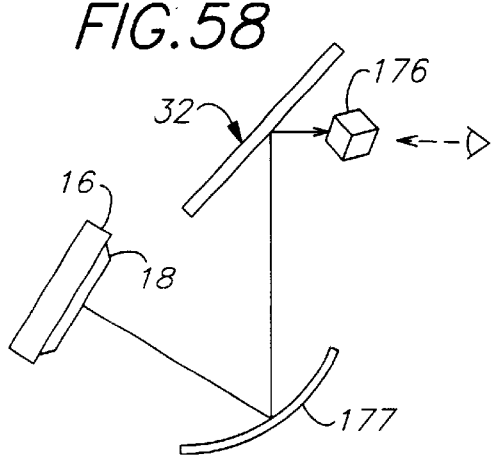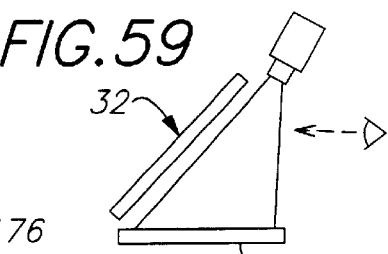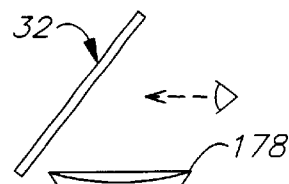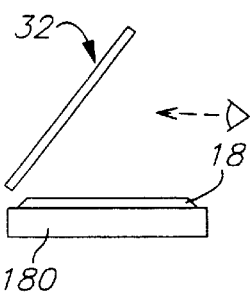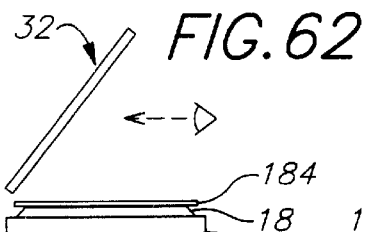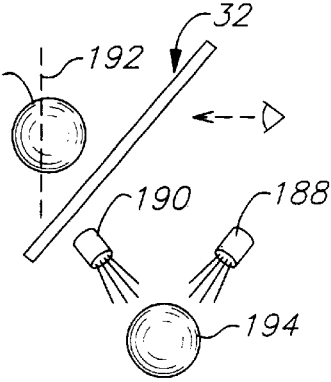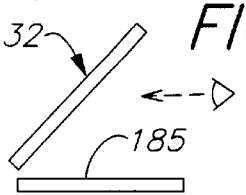

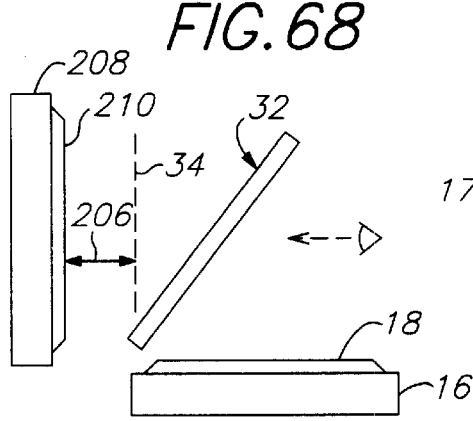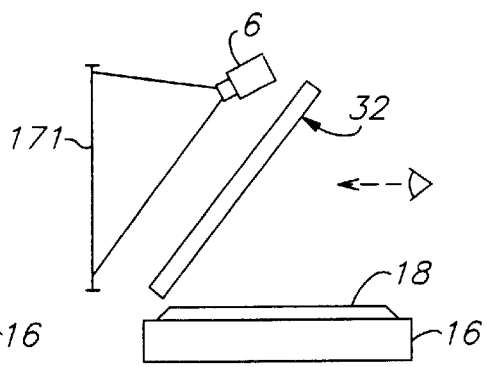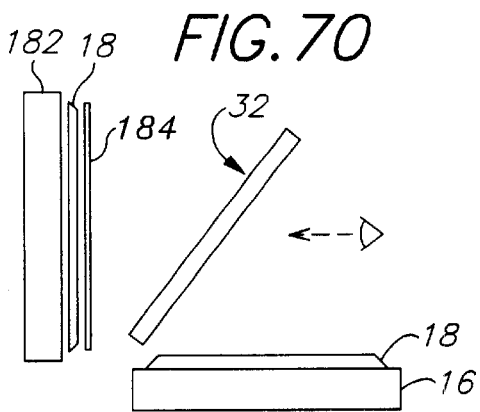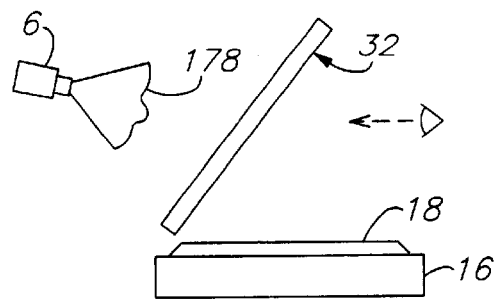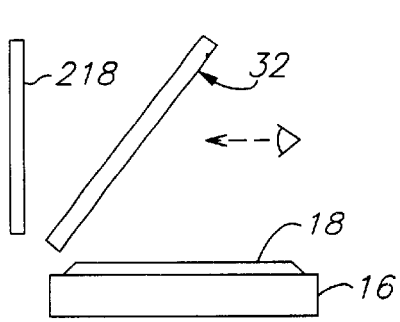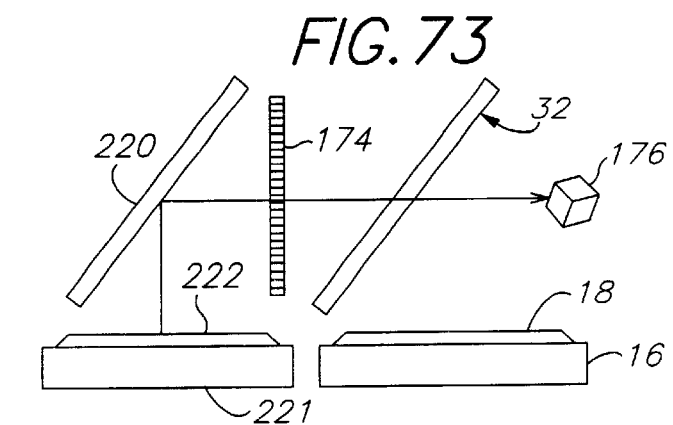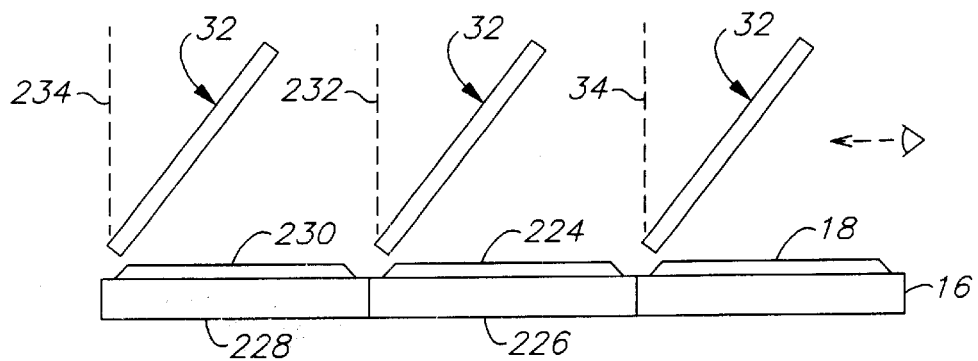

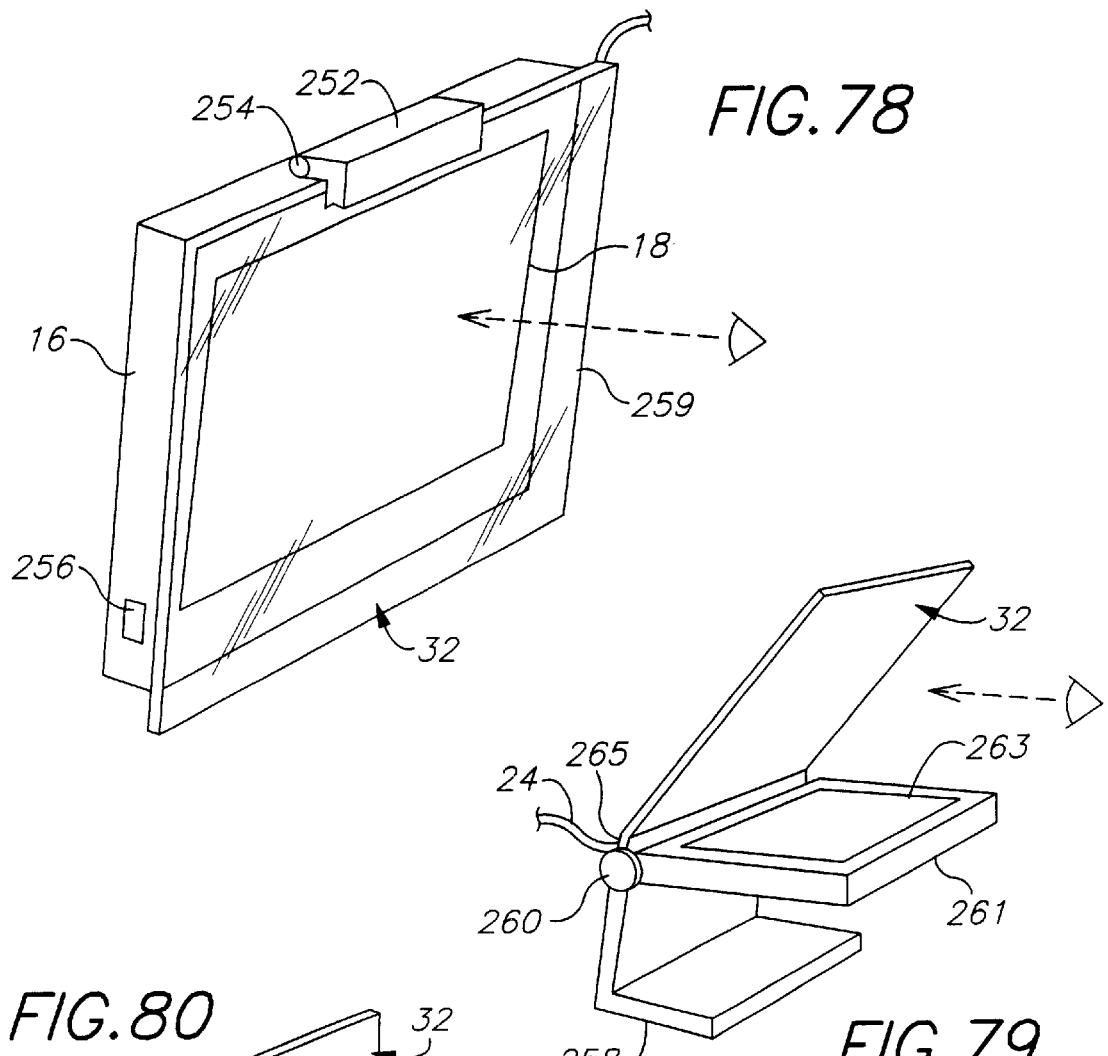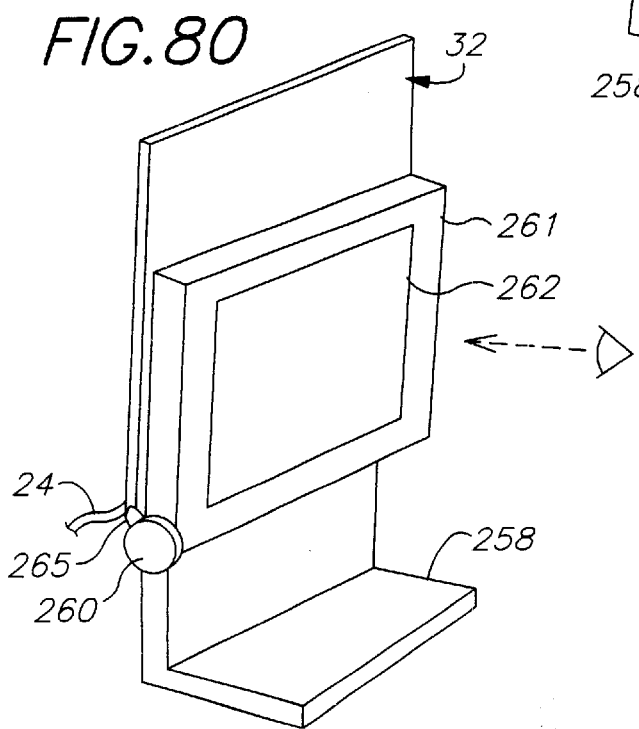

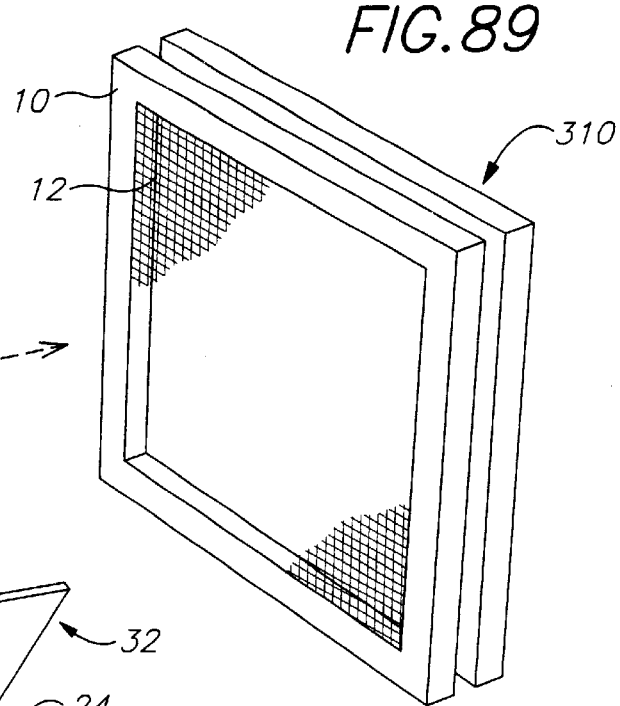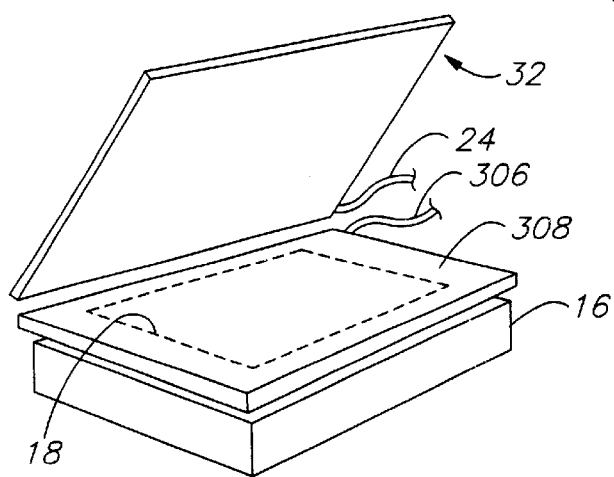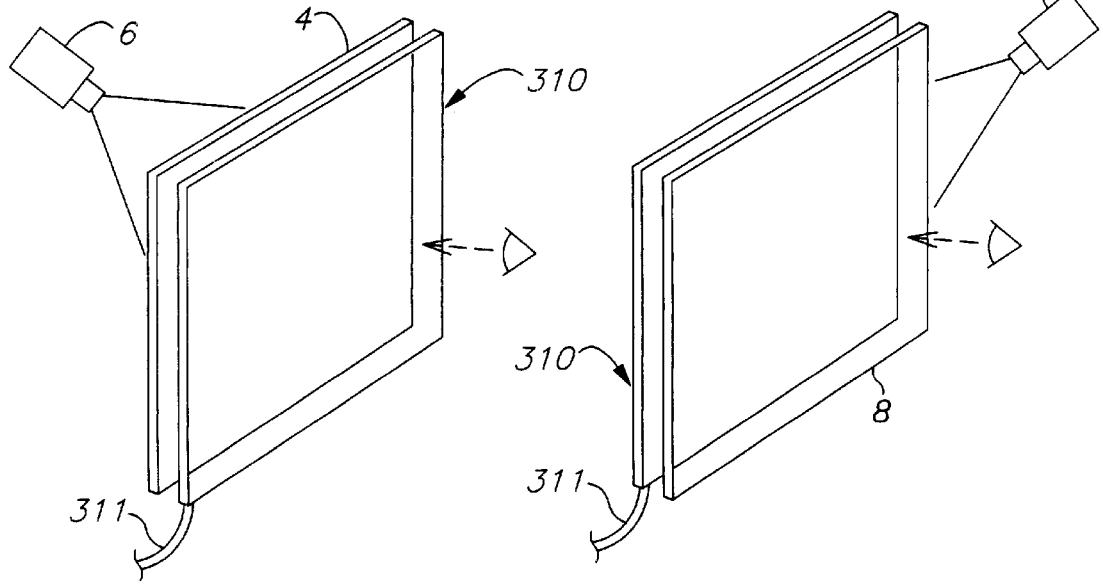

ADJUSTABLE CONTRAST REFLECTED DISPLAY SYSTEM

The present application is a Continuation In Part of Ser. No. 09/777,145 filed Feb. 5, 2001 which is a Continuation of an application of Ser. No. 09/262,974, filed Mar. 5, 1999 and now issued as U.S. Pat. No. 6,243,130, which in turn is a Continuation In Part of application Ser. No. 09/108,476, filed Jul. 1, 1998, now U.S. Pat. No. 5,953,052 which is a Continuation In Part of Ser. No. 08/530,880, filed on Sep. 20, 1995, and now issued as U.S. Pat. No. 5,777,665 which applications are all hereby incorporated by reference into this application.

AREA OF THE ART

The invention concerns the area of presentational displays and, more specifically, an improved display system that alters transparency in synchrony with video content.

DESCRIPTION OF THE PRIOR ART

For years writers and filmmakers of science fiction have envisioned display terminals in the future as being see-through yet still able to fully display a high quality image. The practical aspects of such a display is that it permits the viewer to see beyond the display to the background behind and also, the display itself appears less bulky and less intrusive in the viewer's environment. A transparent display offers the unique feature of being placed in environments, such as retail spaces and tradeshows, and does not obstruct the view of important signage and products. While film-makers can easily simulate this type of video display using computer generated graphics, the actual invention and construction of this kind of video display has been frustrated by numerous problems as evident in the prior art.

A rear projection holographic projection screen 4, as seen in Prior Art FIG. 1, is marketed by Proscreen Inc. of Central Point, Oregon and is one of several technologies that permits a transparent image. A projector 6, located on a rear side of the rear projection holographic screen 4, is angled acutely so that a background 2 is seen. The technology of this type of screen is limited by several obvious problems. First, the holographic material is not manufactured in sufficient size which means several pieces must be positioned together forming a visible joint line 3. Another drawback is that the projector 6 is visible through the screen 4 exposing a blindingly bright projector lens. Another drawback is that the projector 6 and the screen 4 are separate and removed from one another adding complexity to installations, rather than having one single display device. Still another major drawback to the screen 4 is that it is not truly transparent, but milky appearing with luminous colored auras. Another problem is that the image quality is poor lacking accurate color reproduction and lacking sufficient black color levels for appropriate contrast.

A front projection holographic screen 8 seen in prior art FIG. 2 has been developed as well and suffers from the same problems described above for the rear projection holographic projection screen 4. The front projection holographic screen 8 is manufactured by Pronova and sold through a U.S. dealer MCSI of Berkeley, Calif. The screen 8 also suffers from having small visible tiles 5 which further deteriorates the image quality.

Another attempt at a transparent display system uses a liquid crystal display panel (LCD) 10 with a see-through screen 12 as illustrated in prior art FIG. 3. The LCD panel 10 is commonly used as an attachment that fits onto an overhead projector. The problem with such a device is that it requires a backlight (not shown) to make the image fully visible. When no backlight is used the display appears dull and unimpressive. Another drawback is the grid formation between the pixels blocks a portion of the transparency. Still another drawback is that LCD panels are not readily available in large sizes and are more expensive then other displays, such as cathode ray tube (CRT) displays.

Prior art FIG. 4 illustrates a beamsplitter 14 that permits the background 2 to be seen while reflecting a video display 16 with an image bearing screen 18. The use of a beamsplitter 14 and other types of reflective/transparent panels has been well known in the art. The "Peppers ghost illusion" utilizes such an arrangement, but in Shakespearean times actual people were the source of reflections creating a live ghostly image on stage. In recent times the video display 16 is used to display images upon the beamsplitter 14. U.S. Pat. 5,923,469 to Machtig et al. illustrates a variation of this reflected display arrangement using a projector creating a large presentational display with a housing that is extremely open and minimalist in its design (not shown). The beamsplitter permits images to be seen with the same quality as the original source barring one major exception and drawback. The image bearing screen 18 and the light emanating from it must compete with the ambient light from the background 2. If the light from the background 2 is very intense it will wash out the reflected image from the image bearing screen 18. It is for this reason the "Peppers ghost illusion" is usually coordinated with great detail to controlled ambient lighting. Another major drawback is that black levels on video displays are associated with the lack of light being produced by the display. Hence, black and other dark colors do not reflect well upon the beamsplitter 14. For example, if a white spaceship were imaged against black space (not shown) it would appear in the reflection of the beamsplitter 14 that the white spaceship was not in space because the background 2 would appear in the area of the reflection that black space appeared on the image bearing surface 18. The neutralizing effects of ambient light from the background 2 and the reflection of the image bearing screen 18 and the lack of contrast as a result of the beamsplitter 14 not effectively reflecting dark colors from the image bearing screen renders the display arrangement of prior art FIG. 4 impractical for most display uses. For these reasons computer displays, televisions displays, and even large public venue projection displays do not produce high quality images if based upon the arrangement illustrated in prior art FIG. 4.

OBJECTS AND SUMMARY OF THE INVENTION

It is object of the present invention to provide a reflected display system that has an electronically adjustable contrast layer that is adjustable from a transparent to a darkened state for improving the quality of a reflected image.

It is a further object of the present invention to provide a reflected display system that has an electronically adjustable contrast layer that is adjustable between a transparent to a darkened state for improving the quality of a reflected image.

It is yet another object of the present invention to provide a reflected display system that has an electronically adjustable contrast layer that is adjustable from a transparent to a darkened state for improving the quality of a reflected image and the layer being synchronized with video content.

It is a still further object of the present invention to provide a reflected display system that has an electronically adjustable contrast layer that is adjustable between a transparent to a darkened state for improving the quality of a reflected image and the layer being synchronized to video content.

It is an additional object of the present invention to provide an ambient light detector for automatically adjusting an electronically adjustable contrast layer for improving the quality of a reflected display image.

Finally, it is an object of the present invention to provide numerous improvements to the performance and configurations of optical elements of a reflected display.

The present invention aims to provide a transparent video display system that overcomes the significant drawbacks of the prior art as previously discussed. Chiefly the present invention enables a transparent-reflective display to have alterable states of use so that images are viewed upon a transparent piece of glass that can alter to a darkened piece of glass. An assembly that consists of a beamsplitter and an electronically adjustable contrast layer is constructed as a thin sheet of glass and is positioned to reflect a video display. The electronically adjustable contrast layer consists of a shuttering capable material that can be electronically engaged to be in a transparent state and also an opaque (or darkened) state. Liquid crystal shutters are ideal for this invention except they are expensive and not readily available in larger sizes. The preferred electronically adjustable contrast layer is fabricated from a suspended particle device "SPD" due to its promise of being affordable and fabricated into large pieces that could reflect a display beyond six feet (two meters) measured diagonally. Whether liquid crystal or SPD the present invention utilizes an electronic controller for switching between the transparent and opaque states and is capable of providing gradations between transparent and darkened. The electronically adjustable contrast layer enables images to been seen in a mode that best suits its video content as to the degree of contrast selected among the transparent to darkened states. In an alternate embodiment of the invention polarizers (polarizing filters) are mechanically and automatically reoriented to achieve the same functional goals of the electronically adjustable contrast layer.

To further clarify the present invention, one possible operational set of functions are described as follows. In a darkened mode images appear much the same way they do on a standard display—that is the background does not show through the beamsplitter. Hence, common video productions are highly suited for the present display. Upon altering to a transparent mode, the darkened display screen appears to disappear fully exposing the background behind the video display. This feature is especially useful in stores where merchandise may then be seen behind the display. Also, the transparent state substantially reduces the appearance of the display's bulk, offering much greater flexibility to a whole host of display applications, such as desktop computer monitors. Additionally images can be seen while the display is in the transparent state creating a unique effect to standard video images. With the present invention video content, such as a specific object, when isolated on a black field on its display source can appear to be floating upon a piece of glass when this invention is in the transparent state. This is especially helpful for visualizing 3-D graphics for engineering purposes and also provides a stunning effect for advertising purposes.

The alterable states between transparent and darkened can be selected to display a whole host of video productions which appropriately need a certain degree of contrast. A chief embodiment of the present invention is to provide video producers a new level of transparent visual stimuli to move and to inform their targeted audiences. Video content is intended, in this chief embodiment, to be synchronized with the transparent/opaque image glass so that audiences observe the video content and the entire display system transform from transparent to darkened as a part of the entire message communicated. Video producers and others in the film, video, and computer graphic arts will appreciate that they can use the states of transparent to darkened and degrees between as a part of the storytelling, advertisement, video game, and so on.

DESCRIPTION OF THE FIGURES

The objects and features of the present invention, which are believed to be novel, are set fourth with particularity in the appended claims. The present invention, both as to its organization and manner of operation, together with further objects and advantages, may be understood by reference to the following description, taken in connection with the accompanying drawings.

FIG. 5 illustrates an electronically adjustable liquid crystal contrast layer and beamsplitter assembly;

FIG. 6 illustrates an electronically adjustable suspended particle device contrast layer and beamsplitter assembly;

FIG. 7 illustrates an electronically adjustable contrast beamsplitter (hereinafter "EACB");

FIG. 8 illustrates the EACB in a transparent state permitting a background to be seen;

FIG. 9 illustrates the EACB in a state between transparent and darkened permitting both the reflected image and the background to be seen;

FIG. 10 illustrates the EACB in a darkened state blocking out nearly all of the background and adding contrast and increased brightness to the reflected image;

FIG. 11 illustrates a synchronization of a video production with the EACB;

FIG. 16 illustrates a 45 degree angular relationship between the EACB and a display;

FIG. 17 illustrates a zero degree angular relationship between the EACB and a display;

FIG. 18 illustrates a 90 degree angular relationship between the EACB and a display;

FIG. 19 illustrates a two-sided laminated EACB;

FIG. 20 illustrates a one-sided laminated EACB;

FIG. 21 illustrates a back-sided laminated EACB;

FIG. 22 illustrates an EACB that has no lamination;

FIG. 23 illustrates a flexible EACB that can be rolled;

FIG. 24 illustrates an electronically adjustable contrast layer separate from the beamsplitter;

FIG. 25 illustrates two EACBs laminated together;

FIG. 26 illustrates a lamination assembly which includes a beamsplitter, electronically adjustable contrast layer and filter to increase black levels;

FIG. 27 illustrates a tempered EACB;

FIG. 28 illustrates a chemically hardened EACB;

FIG. 29 illustrates a safety laminated EACB;

FIG. 30 illustrates a rounded edge treatment of the EACB;

FIG. 31 illustrates a framed edge of the EACB;

FIG. 54 illustrates the EACB with a rear projection screen;

FIG. 55 illustrates an electronically adjustable contrast layer with a passthrough reflective projection display;

FIG. 56 illustrates the EACB with a CRT;

FIG. 57 illustrates the EACB with a spatial imaging lens display;

FIG. 58 illustrates the EACB with a spatial imaging curved mirror display;

FIG. 59 illustrates the EACB with a front projection screen and projector;

FIG. 60 illustrates the EACB with a curved projection screen;

FIG. 61 illustrates the EACB with any type of flat panel display;

FIG. 62 illustrates the EACB with any type of 3-D display;

FIG. 63 illustrates the EACB reflecting a real object;

FIG. 64 illustrates the EACB reflecting signage systems;

FIG. 68 illustrates the EACB with a display behind;

FIG. 69 illustrates the EACB with a front projection screen behind;

FIG. 70 illustrates the EACB with any type of 3-D display behind;

FIG. 71 illustrates the EACB with dimensional projection screen behind;

FIG. 72 illustrates the EACB with signage behind;

FIG. 73 illustrates the EACB with a spatial object imaged through the EACB;

FIG. 74 illustrates a multi-layered EACB display system;

FIG. 78 illustrates the EACB folded down and viewed through to see the display;

FIG. 79 illustrates the EACB with a two-sided display in a reflected mode;

FIG. 80 illustrates the EACB with a two-sided display in a folded up mode;

FIG. 88 illustrates the electronically adjustable contrast layer on the display and also reflected by a beamsplitter assembled with a second electronically adjustable contrast layer.

FIG. 89 illustrates the electronically adjustable contrast layer used in conjunction with an LCD panel.

FIG. 90 illustrates the electronically adjustable contrast layer used in conjunction with a rear projection holographic screen;

FIG. 91 illustrates the electronically adjustable contrast layer used in conjunction with a front projection holographic screen;

FIG. 100 illustrates the use of polarizers to adjust between the states of transparent, darkened, and increments between.

DETAILED DESCRIPTION OF THE INVENTION

The following description is provided to enable any person skilled in the art to make and use the invention and sets forth the best modes contemplated by the inventors for carrying out their invention. Various modifications, however, will remain readily apparent to those skilled in the art, since the generic principles of the invention have been defined herein specifically to provide a transparent display system with an electronically adjustable contrast layer ensuring that the picture quality of a reflected image is not washed out by ambient background light and is able to display dark colors sufficiently.

Adjustable Contrast Reflected Display System

Figure 1:
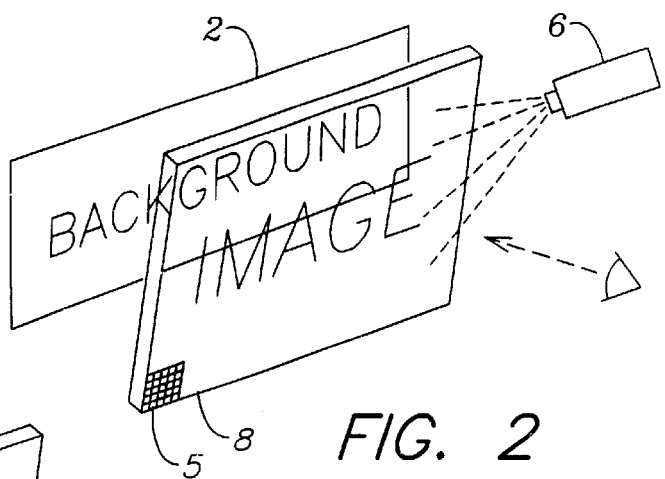
FIG. 1 illustrates a prior art rear projection holographic screen.
Figure 2:
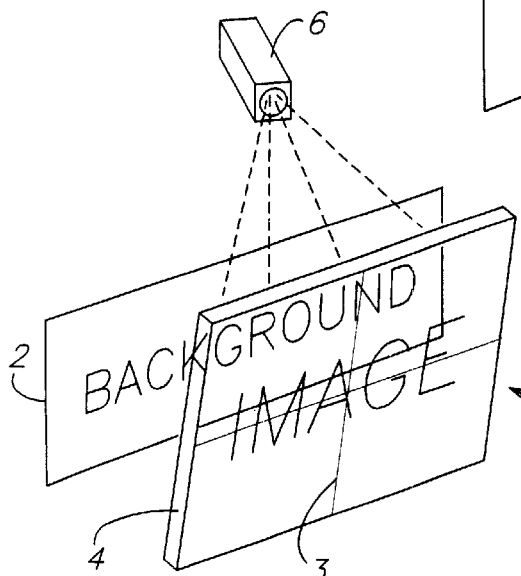
FIG. 2 illustrates a prior art front projection holographic screen.
Figure 3:
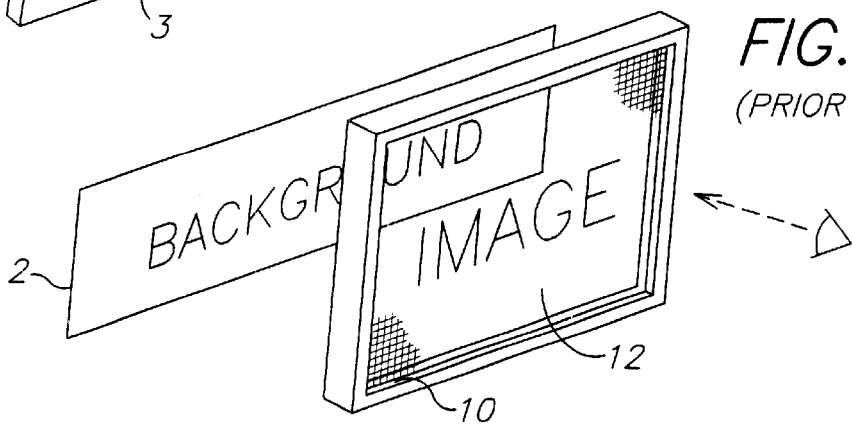
FIG. 3 illustrates a prior art a LCD panel with no backlight.
Figure 4:
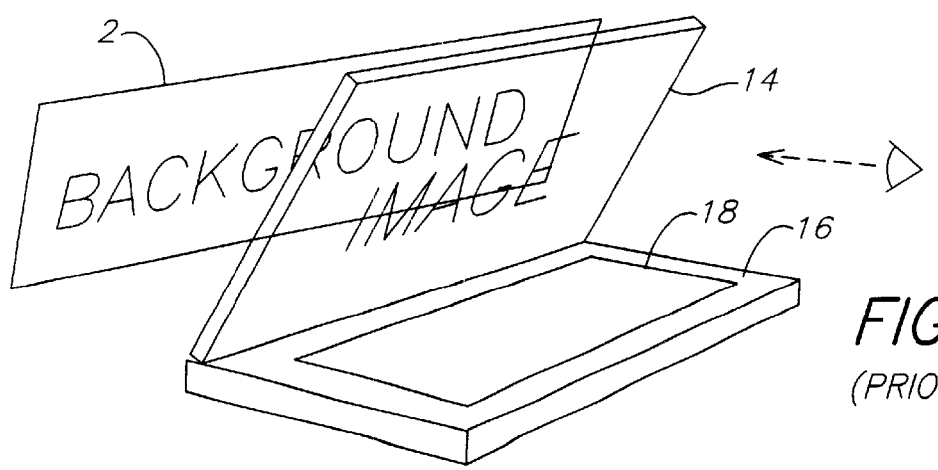
FIG. 4 illustrates a prior art reflected display that permits a background to be seen behind a reflected image upon a beamsplitter.

The present invention overcomes the drawbacks of the prior art and provides a reflected display system that images appear to not be washed out by the competition of light from the background 2 and the image bearing screen 18 as previously discussed for prior art FIG. 4. The construction of the device requires, first and foremost, an electronically initiated layer that can alter from a transparent state to a darkened state. FIG. 5 illustrates the use of a liquid crystal shutter 20; FIG. 6 illustrates the use of a suspended particle device "SPD" 28; and FIG. 7 illustrates a general electronically adjustable contrast layer 30 that can be one of the liquid crystal shutter 20, the SPD and any other similar functioning layer.

FIG. 5 illustrates the use of the liquid crystal shutter 20 and an accompanying electronic controller 26 connected to the liquid crystal shutter 20 by an electronic feed 24. The liquid crystal shutter is laminated between a clear glass back 21 and a beamsplitter 22. The beamsplitter 22 is optimally coated on the side that will reflect a video display (not shown). Liquid crystal shutters primarily have on and off states that are either transparent or opaque/reduced transmission. The liquid crystal (LC) electronic controller 23 is initiated to the on or off state by input line 27 which can be attached to any kind of human interface control or automated control. The LC electronic controller 23 further incorporates in one embodiment of the invention the functions of pulsing the on and off states so that at high pulsing rates the display can take on a semi-transparent mode that is more darkened than the transparent state and more transparent than the darkened state. By adjusting the pulsing between the transparent and darkened states, various selections of between the transparent and darkened states are possible. The pulsing can be at any rate that the desired effect is achieved. Pulsing cycles between 5 and 80 per second offers a range of selection between the transparent and darkened state. One drawback to using the liquid crystal shutter is that human visual perception can detect a flickering effect roughly at 40 or fewer cycles per second. This flickering effect can also be exacerbated by the frame cycles of the video source. Synchronizing cycles between the liquid crystal shutter 20 and the video source can help reduce the flickering effect. The liquid crystal shutter 20 is manufactured by several firms, and one particular is Cambridge Research and Instrumentation of Woburn, Massachusetts. The art of liquid crystal technology has expanded greatly in the past 25 years. As it relates to the present invention cholesteric, ferroelectric or other liquid crystal technologies will suffice so long as the liquid crystal can shutter from a transparent state to a darkened state and will enhance the contrast of the reflected image of a video display.

The use of the SPD 28 for the present invention is preferred since it can alter between the transparent and darkened states and in between without the need for pulsing. The SPD 28 is inherently dimmable with the increase and decrease of applied voltage. Hence, issues of flickering are not of concern. An SPD electronic controller 26 functions at its most basic with on and off states engaging either the transparent and darkened states. The SPD electronic controller 26 also incorporates in the preferred embodiment a voltage rheostat for engaging the dimming functions between transparent and darkened states. An input line 27 allows for any kind of human or automated initiation of the SPD electronic controller 26. The suspended particle device "SPD" 28 is available from its inventive firm Research Frontiers of Woodbury, N.Y., and is also available from one of its many licensees. The term "SPD" covers a broad spectrum of technologies developed by Research Frontiers and its licensees. Variations of and improvements to the technologies that are directly applicable to this present invention may emerge and be marketed or technically referred to by a name other than "SPD." Also variations and improvements of the technologies may be designed and custom fabricated to be optimized for the present invention, Suspended particle devices are broadly defined by the firm as follows: "SPDs use either a liquid suspension or a film within which droplets of liquid suspension are distributed. Light-absorbing microscopic particles are dispersed within the liquid suspension. The liquid suspension or film is then enclosed between two glass or plastic plates coated with a transparent conductive material. When an electrical voltage is applied to the suspensions via the coatings, the particles are forced to align. This allows a range of transparency where light transmission can be rapidly varied to any degree desired depending upon the voltage applied." The firm has envisioned many potential markets of the technology which include architectural windows. They have also demonstrated the technology as an image display technology where the SPD is used as light valves to form an image. Though the present invention is in the field of display technology it is fundamentally different than an SPD image display. An SPD image display creates an image while the present invention reflects an image. Certainly when SPD image displays are commercially available they could be used as the video image source for the present invention and then incorporated into the reflected optical pathway described in more detail in the following sections and accompanying figures.

FIG. 7 illustrates an electronically adjustable contrast beamsplitter 32 herein referred to as the "EACB." The EACB 32 is an assembly of the beamsplitter 22, the clear glass back 21, and the general electronically adjustable contrast layer 30. It is to be understood that the EACB 32, for the sake of simplicity of description in the following sections, includes either the liquid crystal shutter 20 or the SPD 28 or a similar functioning material technology that can change states from transparent to darkened with applied regulated voltage. Also, the EACB controller 29 is to be understood as adaptive having the features and functions required to operate the particular electronically adjustable contrast layer selected.

FIGS. 8 through 10 illustrates the fundamental modes of use of this invention as it effects the displaying of video content in a reflected image 34. FIG. 8 illustrates a first mode in which the EACB 32 reflects the image bearing screen 18 of the video display 16. In FIG. 8, the EACB 32 is in a transparent state fully exposing the background 2. The reflected image 34 lacks sufficient contrast for the fact that the background 2 is so clearly visible. Video content that is substantially bright with vivid colors will be seen in the reflected image 34. Video content, such as black outer space, will not be readily apparent in the reflected image 34. A second mode of use is seen in FIG. 9 where EACB 32 is partially engaged between the transparent state and the darkened state. Dark images such as outer space will become more apparent then what was seen in the first mode of FIG. 7. However, the reflected image 34 still lacks high quality contrast. The ambient light of the background 2 still competes and reduces the contrast of the reflected image 34. FIG. 10 illustrates a third mode of use where the EACB 32 is fully engaged in a darkened state. Video content that includes dark scenes, such as outer space, can now be viewed with full contrast. Many liquid crystal technologies are not true black when shuttered to the darkened state. Likewise, many formulations of the SPD technologies are a deep navy blue. Though it is preferred for the present invention that the darkened state is black it need not be so. It has been found that dark colors resist the ambient light from the background 2 and thereby the beamsplitter 22 of the EACB 32 is much more sensitive to reflecting light the image bearing screen 18. The EACB 32 will, in this situation, reflect the actual black or other dark colors from the video display. Though the EACB may not be perfectly black in its darkened state it will reflect black from the image bearing screen 18 and thereby increase the black levels of the EACB when in the darkened state.

As it relates to the present invention three modes of use as illustrated in and described for FIGS. 8, 9, and 10 may be utilized in any combination. For example, two of the modes may be used in a presentation or all three modes may be used in a presentation. The film, video, and computer graphic producer should understand the present invention as a new creative video display that will offer their artistic imaginations three new modes of visual expression for video content which include transparent with little contrast, darkened with high contrast, and varied between.

While it has been described that the EACB 32 has two fundamental states, which are transparent and darkened, a third state is the increments between these extremes. The definition of "modes of use" just described above implies how these states function together to create a compelling presentation reducing and increasing the contrast of the video content. The EACB 32 should further not be understood as being perfectly clear in the transparent state. Certainly, if and when the liquid crystal and SPD technologies permit clear it that would be the premiere preference. The EACB 32 is, given the existing technologies, slightly tinted when engaged in the transparent state. Likewise, the darkened state may allow some ambient light to impinge from the background 2.

Another chief embodiment of the present invention is to synchronize video content with the EACB 32 states so that modes of use can be utilized where specific images are choreographed with the transparent state, darkened state, and the state between. FIG. 11 illustrates an example of synchronization with specific video content events. A video content time length line 36 is associated with an EACB synch cue line 38. The percentages of the line 38 are 0% for the EACB 32 transparent state and 100% for the EACB 32 darkened state. A first time segment 40 is fully engaged in the EACB 32 darkened state which is followed by a second time segment 41 which is fully engaged in the EACB transparent state. A third time segment 42 begins at 100% darkened state then gradually through the segment dims to a 30% value between the darkened and transparent states. A fourth time segment is in the EACB 32 transparent state then alters to a fifth time segment that is set at a fixed value of 80% between transparent and darkened states, and lastly, a sixth time segment alters back to the EACB 32 transparent state. The video content associated with the video content time length line 36 is produced to achieve specific presentational results synchronized with the EACB 32 states.

Synchronization of video content and the EACB 32 can be initiated by an operator live, such as a person playing a video game which sets in motion a programmed sequence of modes synchronized to video content. Another possible use of synchronization is a control room technician who in real-time coordinates synchronization of EACB 32 states to live or recorded programming. This may be helpful in in-store video networks that are linked to hundreds of this display invention. It is also a potential that the present invention may be used as a consumer television and synchronization cues are sent along with a broadcast to initiate remotely the EACB 32 states of the consumer television. In such a situation live broadcasts could be in realtime encoded for transmission to remote EACB 32 display terminals. Likewise, prerecorded programming could already be encoded to transmit synchronization codes to receiving displays. Most probably the major method of synchronization will be on prerecorded medium with cues and video content combined, such as a DVD or a hard drive. For remote interactive kiosks down loading video content and interactive software can readily include synchronization cues for initiating the EACB 32 states.

One method of synchronizing video content with the EACB 32 is to have both the video content and the synchronization cues in software. When downloaded, a computer plays the video content which may be a video game, video clips, computer graphics, and so on and the cues exit the PC via, for example the RS232 port for connection to the EACB controller 29. Another method is well know in the art and ideally suited to DVDs. A DVD is authored with audio pulses on a discreet audio track which serve as synchronization cues. The EACB controller includes the electronics to receive the audio pulses, interpret the audio pulses, and initiate the regulation of applied voltage that ultimately controls the EACB 32 and its states. One of the many audio channels in the DVD standard would suffice without effecting the performance of stereo audio. Still another method of synchronization is the use of a show controller which is used to engage and control multiple pieces of equipment ranging from lights, video players, projectors, video walls, fog machines, and more. In such an arrangement the EACB 32 is incorporated into the show control protocol so that it becomes another element of the show along with the playback of the video content it is synchronized with.

Another method of utilizing the EACB 32 states is to have the EACB 32 randomly alter states not synchronized to the video content. For certain applications the entire display turning transparent to black randomly may suffice for the given need, such as grabbing attention in a retail space. Another method of engaging the modes of use is to have an observer directly control the EACB 32 states, such as a person who wishes to control the EACB 32 states to their preference. Or for another example, an interactive video game may be designed where the users control the EACB 32 states. Hence, random altering of the EACB 32 states may be user initiated, may be programmed randomly to the video content, and may even be initiated by persons remote from the display or any other input stimuli.

Figure 12:
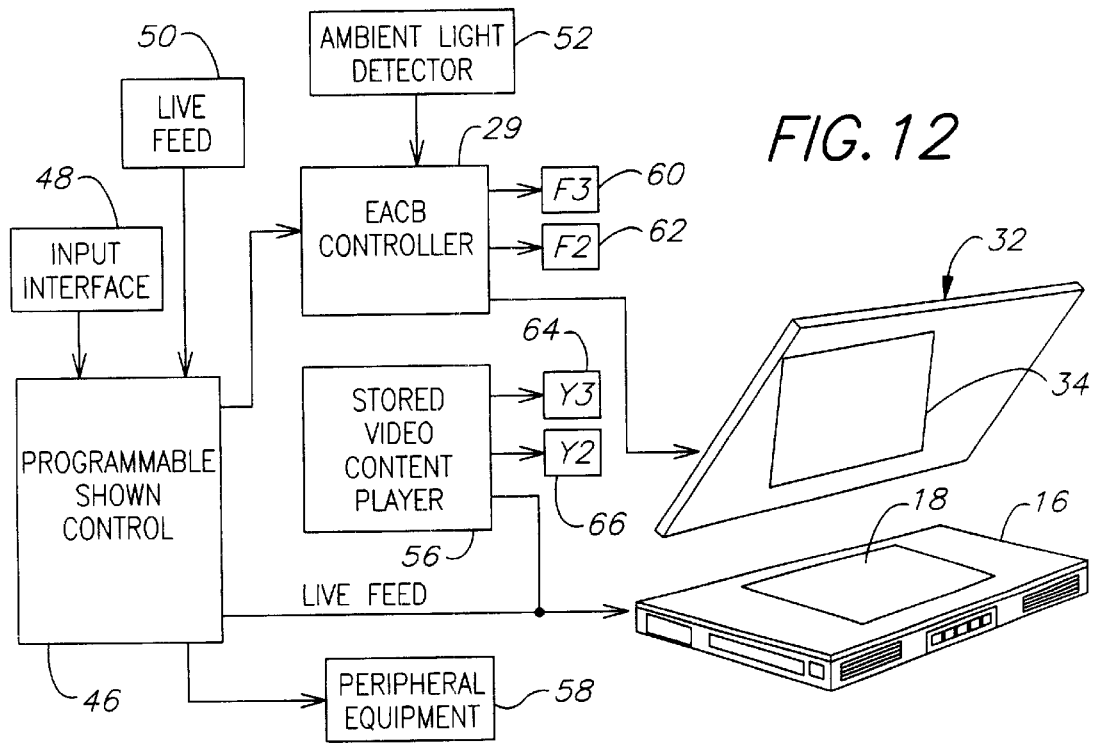
FIG. 12 illustrates a block diagram of electronics for synchronizing video production with the EACB.

FIG. 12 illustrates a block diagram of a complete functional arrangement of the present invention. A programmable show control 46 unit serves as the central computer intelligence of the system. An input interface 48 instructs programs and initiates the programmable show control 46. The input interface 48 can be any type of interface, but at its most simplistic it could be a keyboard and mouse. Video content is sourced from either a stored video content player 56 and also a live feed 50. EACB 32 synchronization cues have been programmed into the programmable show control and time sequenced by time code with the stored video content player 56. The EACB controller 29 receives data codes or audio pulses. The diagram further illustrates that more than one EACB 32 can be controlled with a feed #2 62 and a feed #3 60 and they are each synchronized to a video #2 66 and a video #3 64. Hence, the system diagram can operate multiple electronically adjustable contrast displays in a complete show. A peripheral equipment 58 connection is also included for controlling other devices, such as lights, lasers, projectors and so.

An ambient light detector 52 is also included to automatically adjust the EACB controller 29 to various settings of maximum transparency and darkness. For example, in the evening, when ambient light is minimal, images upon the EACB 32 in a particular transparent value will appear bright and vivid. That same transparent value, however, during the day does not offer sufficient contrast due to the increased ambient light. The ambient light detector 52 automatically signals the EACB controller 29 to reset the base value of transparency to accommodate the change in ambient light conditions. Likewise, the darkened state can be set to certain varying values and adjust automatically to the change in ambient light.

Figure 13:
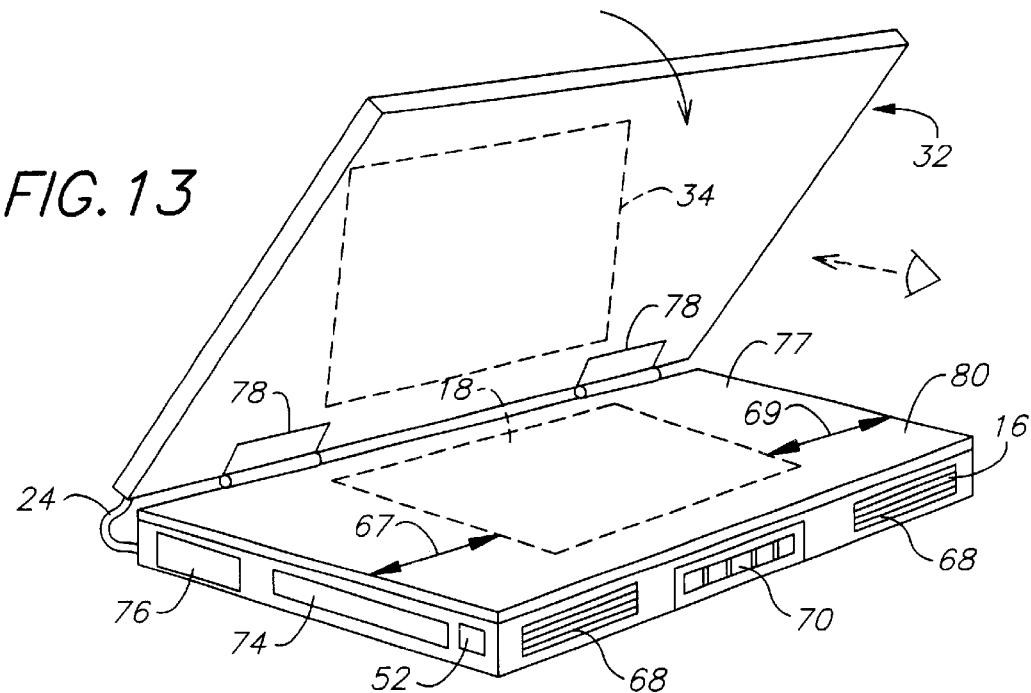
FIG. 13 illustrates a preferred construction of the present invention.

FIG. 13 illustrates one preferred construction of the present invention. The EACB 32 is hinged by stiff hinges 78 to display 16. Display 16 operates from batteries 76 or direct power (not shown). The display 16 contains the EACB controller 29 (not shown) and a DVD playback 74 that synchronizes the EACB 32 and EACB controller 29 with video content displayed on the image bearing screen 18. Also included is the ambient light detector 52. A pair of speakers 68 and a button interface 70 that controls the entire device are included. An extended antireflective clear panel 80 is positioned across the entire surface so that a bezel 77 that surrounds the image bearing surface 18 is not in appearance different than the image bearing screen 18. To further explain, the bezel 77 is near black in color to match the image bearing screen when it is displaying black. The extended antireflective panel 80 covers both the image bearing screen 18 and the bezel 77 creating a seamless surface. The bezel 77 need not be black, but rather the extended antireflective clear panel 80 may be black coated on its side facing the image bearing screen 18 in those areas that cover the bezel 77. The extended antireflective clear panel 80 is used so that the bezel 77 is not seen as a part of the reflected image 34. The bezel 77, if seen in the reflected image 34, would be an irritant by eliminating, in part, the appearance of images floating upon the EACB 32. Certain video content, especially video objects isolated on a black field as described for FIG. 14. will appear more 3-D and solid when the bezel 77 is not seen in the reflected image 34.

A left bezel extension 67 and a right bezel extension 69 expands the surface area of the extended antireflective glass 80 to the left and the right. The EACB 32 is wider than the image bearing screen 18 so that the viewing angle of the reflected image 34 is extended left and right. The left bezel extension 67 and the right bezel extension 69 permit a more controlled reflection upon the EACB 32 to each side of the reflected image 34. Without the bezel extensions 67 and 69, the EACB 32 would reflect, for example, a desk the device is placed upon to the left and the right of the reflected image 34 (not shown).

Figure 14:
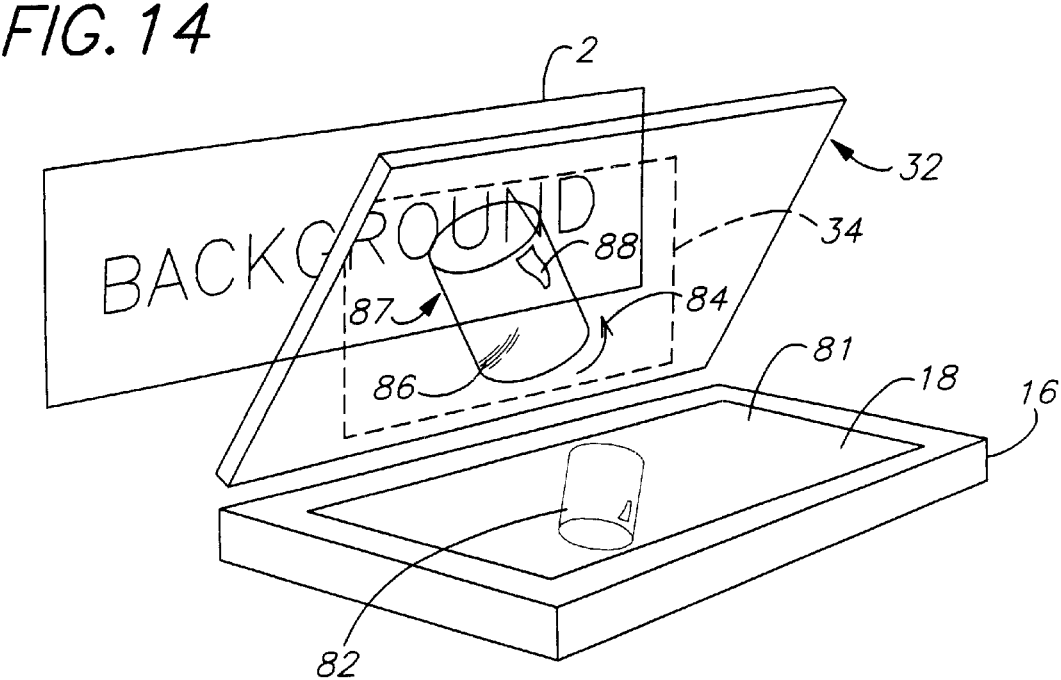
FIG. 14 illustrates the combination of an EACB in a transparent state, making the background visible and a video object produced to simulate a solid 3-D object when viewed upon the EACB.

A further primary embodiment of the present invention is illustrated in FIG. 14. The peppers ghost illusion as described in prior art FIG. 4 suffers from several drawbacks. A primary drawback is that ambient light needs to be controlled, especially the background 2 should be dark enough so that images are bright. This reflected illusion has never had practical application devices, such as computer display, consumer televisions, and public venue displays, due to the fact that ambient light washes out the image. The present invention resolves this problem with the EACB 32 that can be engaged in a state of increments between transparent and darkened. For example when background 2 has high ambient light the EACB 32 is engaged at a value between transparent and darkened that optimally suits the presentation of a clear image that is not washed out. Likewise, as the background 2 has low ambient light the EACB 32 is engaged at its full transparent state. The ambient light detector 52 can assist greatly in automatically engaging the values that are optimum for the presentation of the video effect. The peppers ghost illusion is further enhanced by isolating a video object 82 on a black field 81 as seen in FIG. 14. In the reflected image 34 the black field 81 appears as the background 2 creating the illusion that the reflected video object 87 is floating on the piece of glass. The illusion is further supported by additional elements, such as a movement 84, a shading effect 86, and a reflection 88. Separately and in conjunction, these visual stimuli assist the reflected video object to appear floating on the EACB 32 and also appear 3-D and solid in form.

Figure 15:
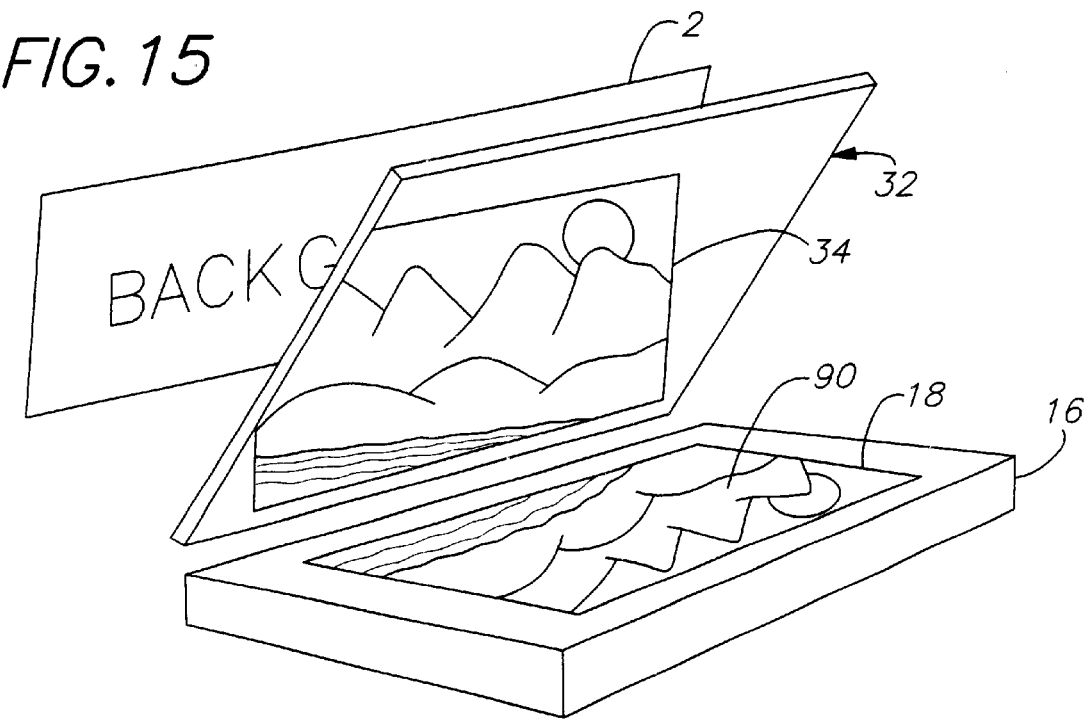
FIG. 15 illustrates a common 2-D video production viewed upon the EACB in a darkened state.

Further, the present invention not only can adjust to the appropriate transparent/darkened value to present the peppers ghost illusion, it can as well transform instantaneously with the engagement of the EACB 32 to the darkened state present a standard video production 90 with high contrast and bright images that are not washed out as seen in FIG. 15. The creative possibilities of this display invention are endless since it permits both a transparent 3-D illusion and high quality presentation of standard video productions. While the transparent 3-D illusion is entertaining there are practical benefits as well, such as engineers being able to visualize 3-D models beyond the confine of a common video screen.

For basic constructional design of the present invention, the angular relationship of the EACB 32 and the video display 16 can vary greatly depending upon the particular application. FIG. 16 illustrates the most straightforward angular relationship of 45 degrees between the EACB 32 and the video display 16. The EACB 32 can be tilted backwards and forwards and the video display 16 can as well be tilted up or down. Ultimately positioning the EACB 32 and the video display, the reflected image 34 and its orientation is a guiding factor. FIG. 17 illustrates that a zero degree angular relationship is as well one possible configuration of the present invention. Further, FIG. 18 illustrates a 90 degree angular relationship between the EACB 32 and the video display 16. Those skilled in the art will appreciate the varying configurational possibilities that will suit their specific application.

Those skilled in the art will appreciate the options afforded the EACB 32 in its construction. The beamsplitter 22 can be vacuum deposit coated, optically dip coated or other process. The beamsplitter 22 can be of any clear or semi-clear substrate such as plastic or glass and a rigid panel or a flexible panel. Even off-the-shelf one-way mirrors may suffice for a certain application. The beamsplitter 22 may also have no reflective coating so long as its surface is inherently reflective. Typically, a beamsplitter custom designed with a roughly 40% reflective and a 60% transmission values with a high quality first surface metallic coating is preferred. With some metallic and reflective coatings, even though fabricated to reflect the full spectrum of light, may react in unexpected manners to some display screens and also some projection screens. Many new high bright rear projection screens are polarized so they may reflect only a portion of the visible spectrum of light. Anti-reflective coatings may as well be applied to the back side of the beamsplitter 22 to reduce the back side from reflecting the image bearing screen 18 forming a double image (not shown). Those in the optical arts can adjust the metallic coating for the specific display or projection screen to be reflected.

FIGS. 19–31 are variations of the EACB 32 and may be used in any embodiment illustrated in place of the EACB 32. Also, the combination of the various optical configurations illustrated in FIGS. 19–31 will be readily apparent to those skilled in the art. FIG. 19 illustrates the general electronically adjustable contrast layer 30 laminated to the clear glass back 21 and the beamsplitter 22. FIG. 20 illustrates the use of the general electronically adjustable contrast layer 30 laminated only to the beamsplitter 22. FIG. 21 illustrates the use of the clear back glass 21 with general electronically adjustable contrast layer 30 serving as the reflective substrate to reflect the video display 16. In such an arrangement, metallic or other reflective coatings may be applied to the surface of the general electronically adjustable contrast layer 30 or it may be sufficiently reflective without additional treatments. Similarly, FIG. 22 illustrates the general electronically adjustable contrast layer 30 serving as the complete component replacing the EACB 32 yet having the same features. FIG. 23 illustrates a similar approach as discussed for FIGS. 21 and 22 except a rollable electronically adjustable contrast layer 96 can be rolled to a compact size upon a first roller 92 and a second roller 94. A rollable system offers many configurationally possibilities for the present invention especially in large systems where a solid glass substrate may be difficult to handle. FIG. 24 illustrates the general electronically adjustable contrast layer 30 positioned behind the beamsplitter 22. A second general adjustable contrast layer can be added as seen in FIG. 25 to increase the darkness of the darkened state. An optical filter 100 can be added to increase the darkness of the darkened state and optionally to change the tint of the general electronically adjustable contrast layer 30 in any state. Similarly the beamsplitter 22 can be an optimally tinted neutral density filter, such as smoked glass (not shown), and achieve the same goals as the optical filter 100. FIG. 27 illustrates the use of tempered glass for the beamsplitter 22 that will resist impact from the hammer 102. A chemically hardened beamsplitter 104 may be used to increase strength and safety, and be a thinness glass substrate reducing the appearance of a double reflection common to thicker beamsplitters. FIG. 29 illustrates the use of a safety film 106. FIG. 30 illustrates a rounded edging technique 108. FIG. 22 illustrates a frame 110 surrounding the beamsplitter 22 and the general adjustable contrast layer 30.

Figure 32:
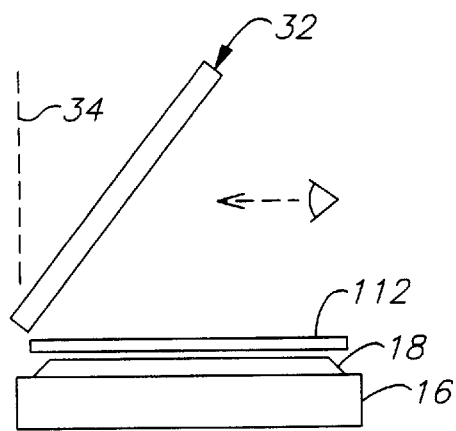
FIG. 32 illustrates a polarizer added to the display surface.
Figure 33:
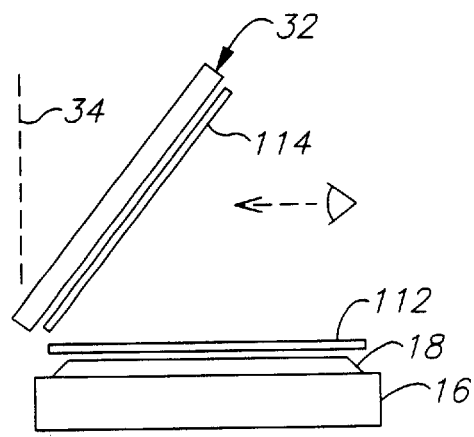
FIG. 33 illustrates a polarizer added to the display surface and a second polarizer added to the reflection side of the EACB.
Figure 34:
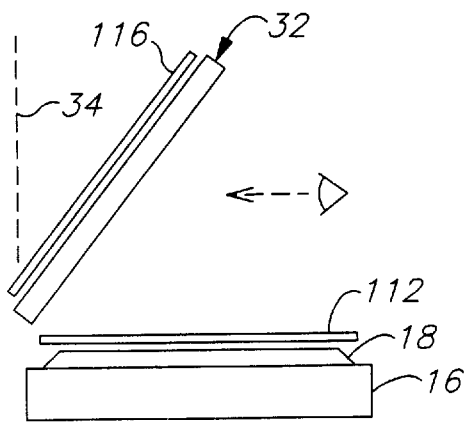
FIG. 34 illustrates a polarizer added to the display and a second polarizer added to the backside of the EACB.
Figure 35:
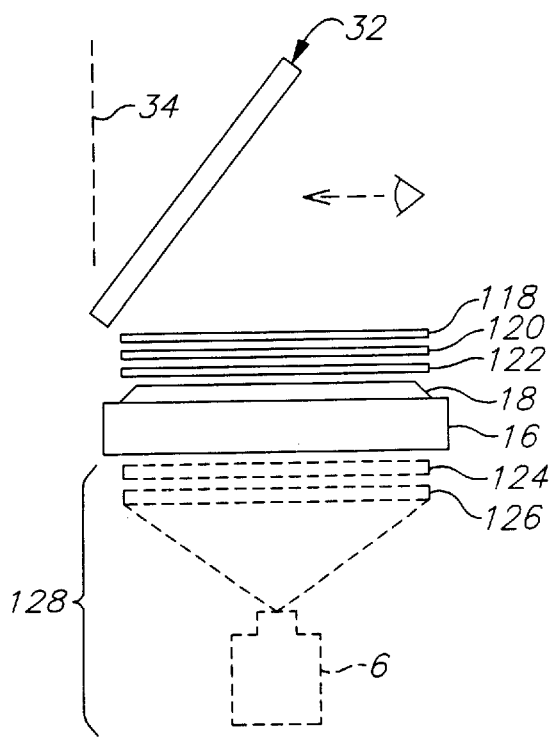
FIG. 35 illustrates a variety of optical layers that will increase the apparent contrast of the display.
Figure 36:
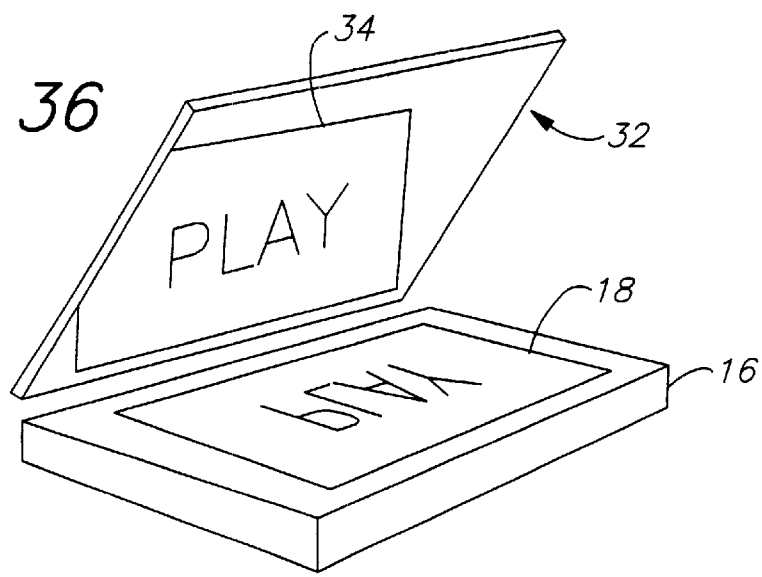
FIG. 36 illustrates a mirror inverted signal reflected by the EACB.
Figure 37:
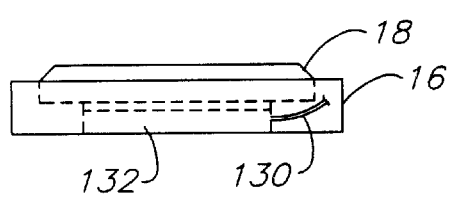
FIG. 37 illustrates an electronic manipulation of the display to create mirror inversion.
Figure 38:
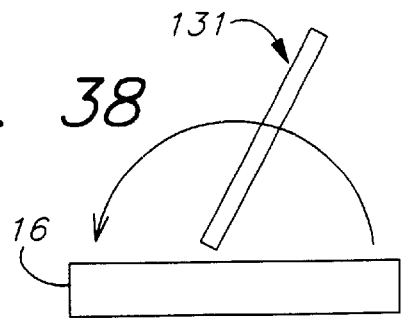
FIG. 38 illustrates a flipping of an LCD panel to create a mirror inverted display.
Figure 39:
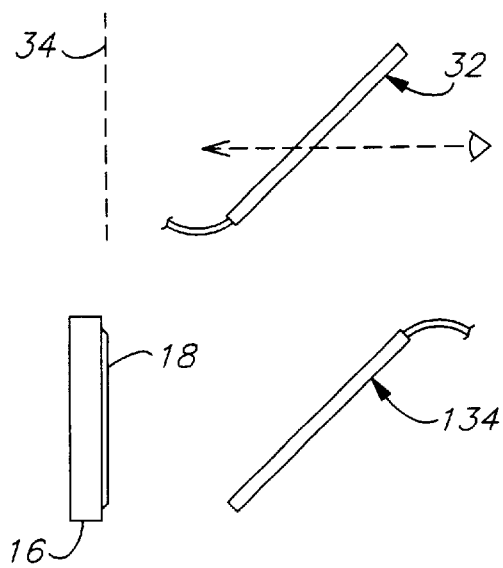
FIG. 39 illustrates a mirror added to the optical pathway to display a correct image upon an EACB.

The present invention preferably utilizes a high quality video display 16 that has a high contrast ratio so that blacks are truly black as seen on the image bearing screen 18. This is especially important when viewing the reflected video object 87 of FIG. 14. If the video display 16 has poor contrast a gray field (not shown) and the full perimeter of the image bearing screen 18 may be seen in reflected image 34 instead of a black field 81 of FIG. 14. The black field 81 permits ambient light from the background 2 to be seen enhancing the appearance that the reflected video object 87 is floating. To enhance the contrast levels of the video display 16 a polarizer 112 is added to the surface of the image bearing screen 18. The polarizer can be oriented to the EACB 32 to increase the contrast of the reflected image 34. Polarized SPD layers, custom constructed polarized liquid crystal shutters, and custom indexing of the polarization of the beamsplitter (all not shown) can assist in increasing the contrast of the reflected image 34 in conjunction with the image bearing screen 18. FIG. 33 illustrates the addition of a second polarizer 114 that is oriented to the polarizer 112 to increase the contrast. The polarizer in this position would be coated to serve also as the beamsplitter 22. A rear mounted polarizer can as well be oriented to increase contrast. FIG. 35 illustrates the video display 16 with a neutral density optical filter 122, an image blocking film 120, and an antireflective contrast element 118 all of which together, in combination and individually, will increase the contrast of the image bearing screen 18. In a rear projection system 128 of FIG. 32 the video display 16 is removed yet all the other elements may remain. A rear projection screen 124 is also accompanied by an anti-reflective projection glass 126 that maintains maximum brightness of the rear projection screen 124 and reducing the light reflected before dispersing upon the rear projection screen 126. Since the present invention requires a reflection from a video display 16 the image will appear mirror inverted in the reflected image 34. FIG. 36 illustrates that video content can be mirror inverted before playback in post production. The mirror inversion can also be achieved by a signal converter box for mirror inversion (not shown). Another technique to mirror invert is to change the yoke wires on a CRT display (not shown). Another method for mirror inverting is seen in FIG. 37 where the videoboard 132 has image the inversion feature and is connected by video signal wires 130 to the video display 16. A liquid crystal display 131 can be rotated for mirror inverting as seen in FIG. 38. Also, liquid crystal displays can be mirror inverted in the display electronics which requires a skillful technician. Still another method of mirror inverting is to use a first surface 134 as seen in FIG. 39. Other methods of mirror inverting will be determined by the type of video display used.

Figure 40:
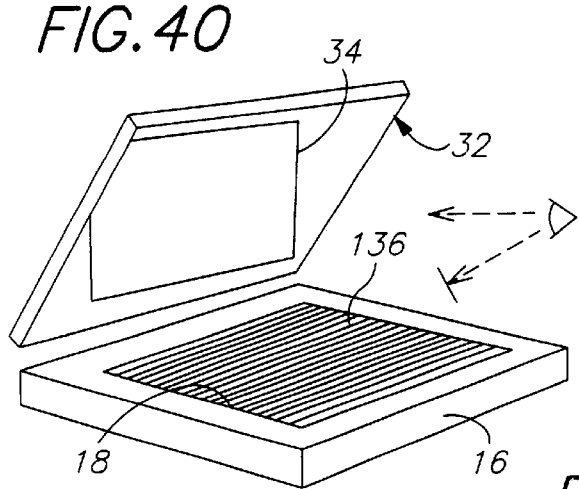
FIG. 40 illustrates an image blocking layer added to the display.
Figure 41:
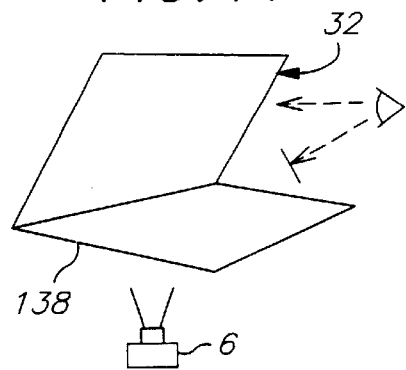
FIG. 41 illustrates a low vertical viewing angle projection screen.
Figure 43:
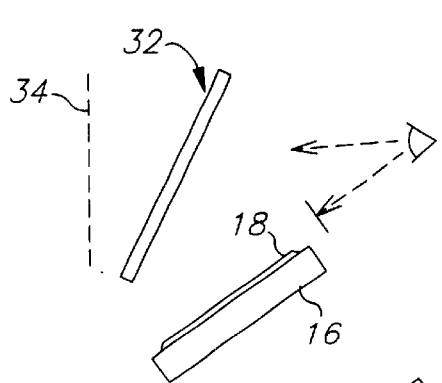
FIG. 43 illustrates an acutely angled display to conceal the image.
Figure 42:
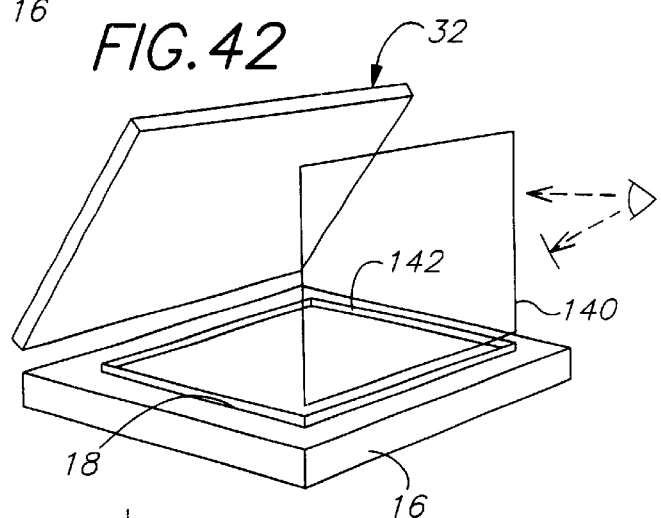
FIG. 42 illustrates the use of polarizers to image block.
Figure 44:
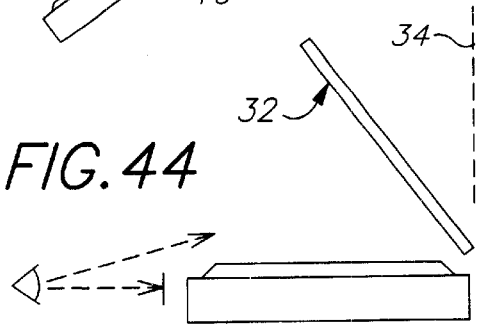
FIG. 44 illustrates a raised display to conceal the image.
Figure 45:
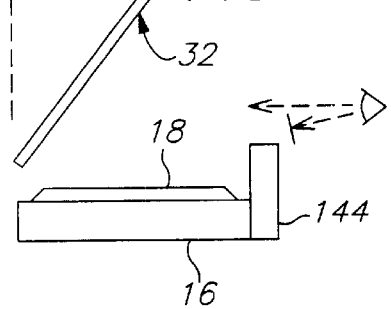
FIG. 45 illustrates a partition to conceal the display.
Figure 46:
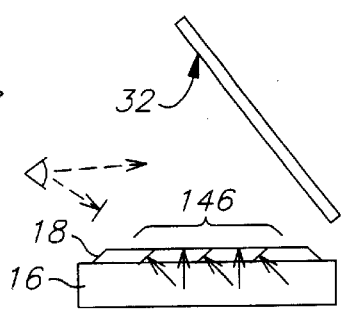
FIG. 46 illustrates an image display that is constructed with a low vertical viewing angle to conceal the display.
Figure 47:
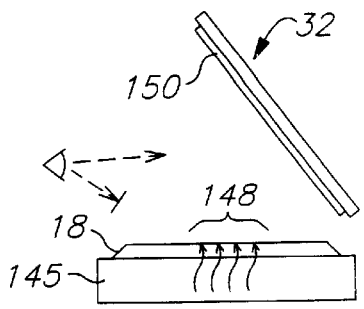
FIG. 47 illustrates a partially polarized display in which the image is formed by a second polarizer as a part of the EACB assembly.

Another embodiment of the present invention is image blocking the image bearing screen 18 so that an observer sees only the reflected image 34. It is an irritant and confusing to see two images at once. An image blocking film 136, manufactured by 3M, or other similar function layer blocks image bearing screen 18 entirely, as seen in FIG. 40. The image blocking film 136 consists of tiny micro louvers that direct the light from the image bearing screen 18 toward the EACB 32 and away from the observer. Another method of image blocking is to use a low vertical viewing angle rear projection screen 138 (FIG. 41). The low vertical viewing angle of the screen 138 blocks most light from the image from the observer. Another method of image blocking (FIG. 42) positions a first image blocking polarizer 142 over the image bearing screen 18 and another front polarizer 140 positioned in front of the display system. Here the reflected image 34 is visible through one polarizer and the image bearing screen 18 is blocked by two polarizers. Still another method of image blocking is to angle the display 16 away from the observer as seen in FIG. 43. FIG. 44 conceals the image bearing screen 18 by raising it to a height that the video display 18 blocks its view. A partition block 144, as seen in FIG. 45 may also be constructed to hide the image bearing screen 18 from the observer. FIG. 46 illustrates a fabrication of a low vertical viewing angle video display 16 as illustrated with a low vertical viewing angle segment 146. Still another method of image blocking is seen in FIG. 47 where a liquid crystal display 145 has an image formed by an image polarizer 150 removed from the display 145 and positioned upon the EACB 32 to form the image. The image polarizer 150 can be positioned in front, behind or within the EACB 32 and even be replaced by a polarized beamsplitter or the general electronically adjustable contrast layer 30 provided it is polarized.

Figure 48:
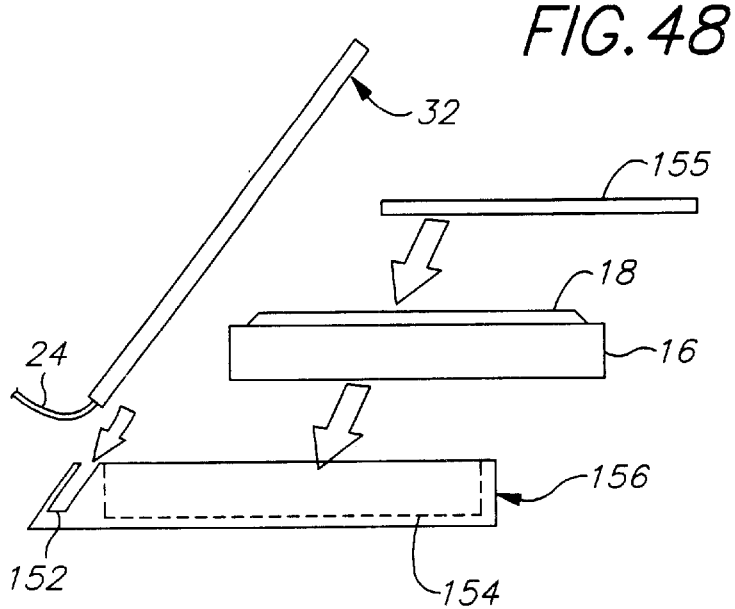
FIG. 48 illustrates a kit for receiving a flat panel display.
Figure 49:
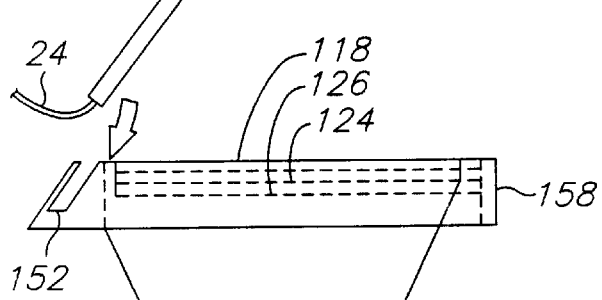
FIG. 49 illustrates a kit for receiving a projector.
Figure 50:
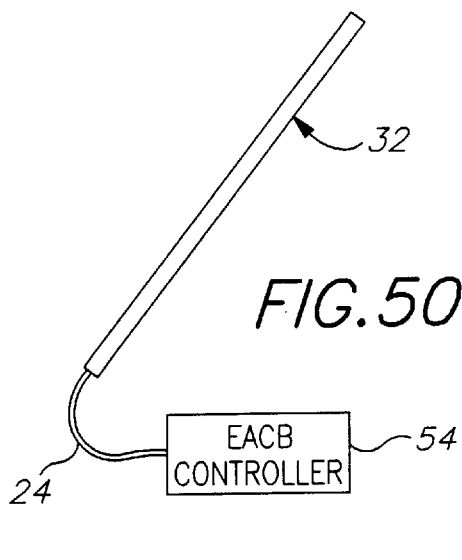
FIG. 50 illustrates a kit which includes the EACB and electronics for controlling the EACB.

Another embodiment of the present invention is to provide a kit system that consumers and professionals can use with their own video display 16 or projector 6. FIG. 48 illustrates a display pod 154 that receives the display 16 into well 154 and then covered by an optional removable anti-reflective layer 155. The EACB inserts into a sleeve 152. For those with a projector 6, FIG. 49 illustrates a projection pod 158 with rear projection screen 124. Preferably the projection kit includes the anti-reflection projection glass 126 and anti-reflection contrast element 118. Another variation of a kit that can be sold to consumers and professionals is seen in FIG. 50. Here the EACB 32 is sold with EACB 54 controller so that the complete system can be made with only the addition of the video display 16 or projector 6 (not shown). Variations of the kits described will be apparent and will transform as customers demands change and display technology changes.

Figure 51:
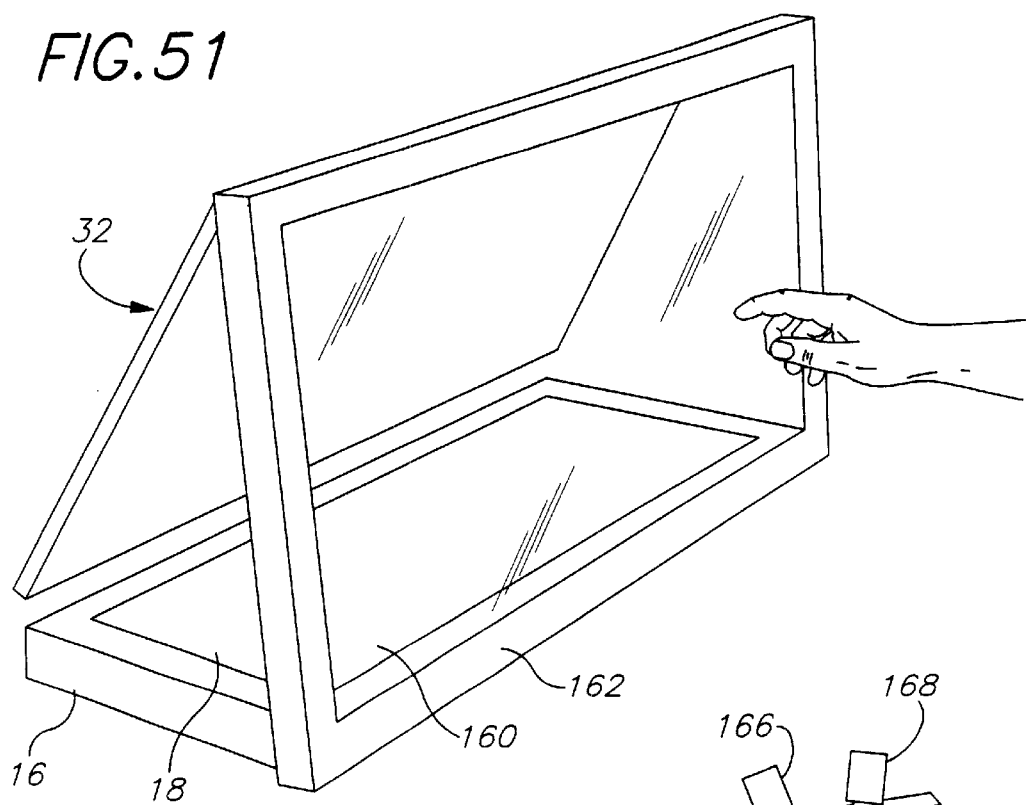
FIG. 51 illustrates a touch screen interface positioned in front of the EACB.
Figure 53:
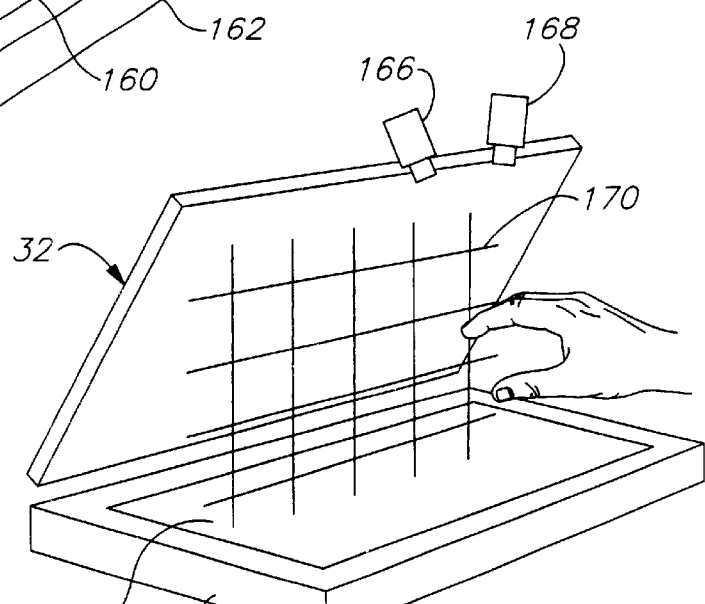
FIG. 53 illustrates a open air interface.
Figure 52:
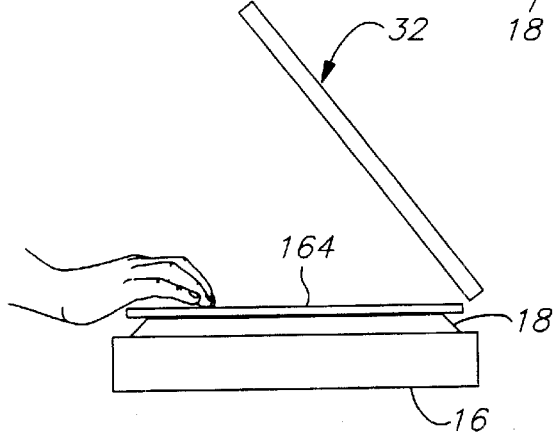
FIG. 52 illustrates a touch screen interface positioned on top of the display.

Various input technologies can be used with present invention to control video chapters, software, video games, and so on. FIG. 51 illustrates a touch screen 160 in a frame 62 placed in front the display system for initiating control of the EACB 32 and/or other control functions. Likewise, FIG. 52 illustrates a horizontal touch screen 164 placed upon the image bearing surface 18. The operator can adjust hand movement to its reflection in the EACB 32 (not shown). Another method of input control is to use an air grid 170 (FIG. 53) formed by stereoscopic cameras 166 and 167. Other air grid and other input technologies, such as microwave sensors, are as well deployable with the present invention.

Video display 16, or any image production device used with the present invention, should be understood as all display technologies such as CRT, LCD, plasma, OLED (organic LED), including video and film projection technologies, etc. The video display should also be understood as any type of video signal including, but not limited to, NTSC, PAL, SECAM, HDTV, COMPUTER VIDEO, and any other video or film formats. The definition of "video content" as used in this description and claims should be understood as any type of image produced upon the image bearing surface 18 of the video display 16. A variation of the present invention includes an open air terminal as seen in FIG. 54. The projection screen 124, anti-reflection projection glass 126, and the anti-reflection contrast element 118 are supported horizontally and the projector 6 is located in a separate section base 175. The projection screen 124 and the EACB 32 are supported by monopole 173 which is attached to the section base 175. The section base further includes a small projection glass 179 and a small first surface mirror 183 for folding the projection beam of the projector 6. The projector 6 and a small first mirror 183 are arranged so that an existing projector lens can be used without the expense of a wide angle lens (not shown). The separate section base 175 further includes an antireflective paint 181. Antireflective paint 181 may be a dark light absorbing color to minimize the dispersion of the projection beam reflected from the anti-reflection projection glass 126. FIG. 55 illustrates a pass-through reflective projection pathway as seen in U.S. Pat. No. 5,639,151 to McNelley et al. where the projection beam passes through the beamsplitter onto a front projection screen 171. The EACB 32 is positioned out of the projection beam pathway. FIG. 56 illustrates the present invention utilizing a cathode ray tube 172. FIG. 57 illustrates a lens 174 producing spatial image 176. Likewise, the spatial image 176 can be produced by curved mirror 177 as seen in FIG. 58. Multiple lenses, multiple curved mirrors and combinations may be used to create the spatial image 176 (all combinations not shown). FIG. 59 illustrates the use of the front projection screen 171 which may also be dimensional in shape (not shown). FIG. 60 illustrates the use of a dimensional rear projection screen 178. The dimensional rear projection screen 171 can be configured into any form. FIG. 61 illustrates the use of a flat panel display 180 which can be any flat panel technology, such as liquid crystal and plasma. FIG. 62 illustrates a specialized 3-D display which may require a 3-D enhancement layer 184. As display technology improves those improved displays are readily integrated into the present invention. FIG. 63 illustrates the present invention reflecting upon the EACB 32 an actual object 194 illuminated by a first light 188 and a second light 190 and creating a real reflected object 186 in a real reflection 196. Similarly the present invention may use a signage system 185 of FIG. 64 which can include any type of sign system, such as back lit signs.

Figure 65:
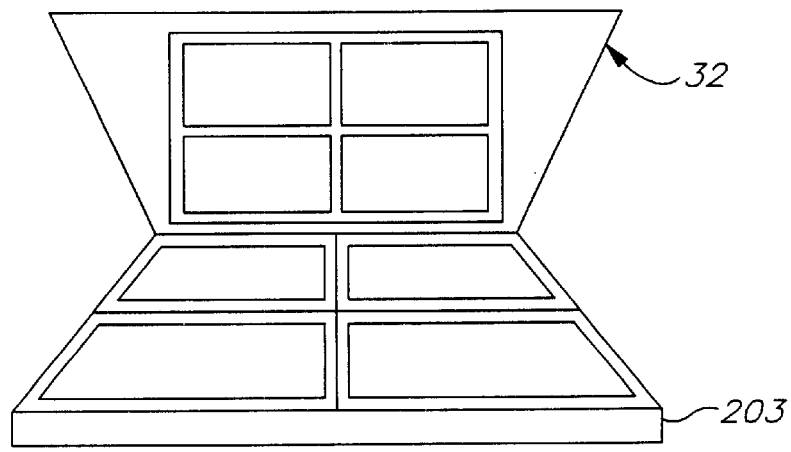
FIG. 65 illustrates the EACB reflecting many displays.
Figure 66:
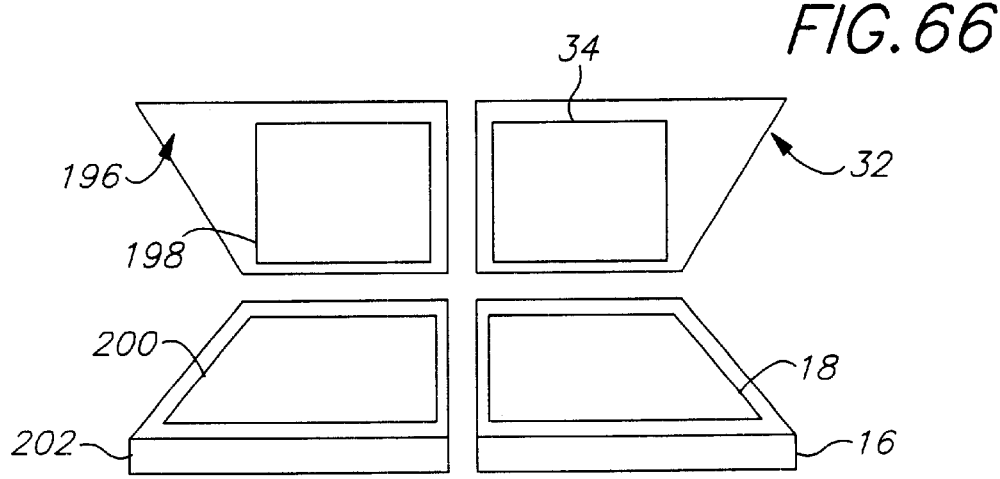
FIG. 66 illustrates two or more EACB reflecting two or more displays.
Figure 67:
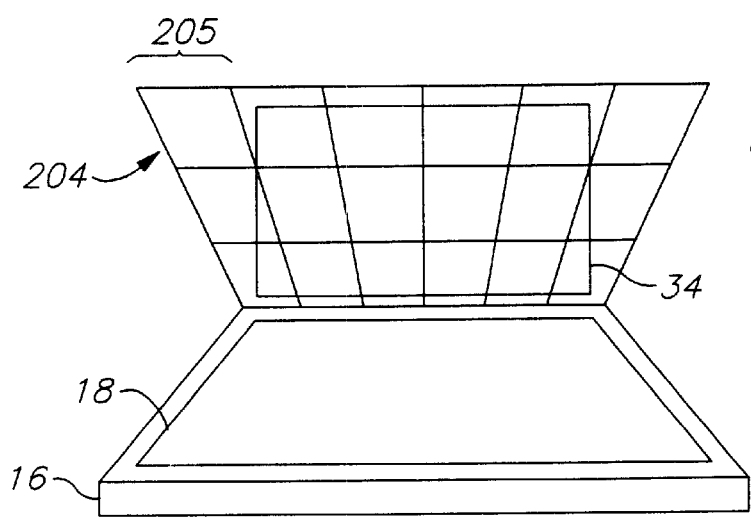
FIG. 67 illustrates a segmented electronically adjustable contrast layer reflecting a display.

Other configurations of the present invention include reflecting a multiple image bearing screen array 203, such as a video wall or connected flat panels as seen in FIG. 65. Here, one EACB 32 reflects multiple displays which all can be operated as a video wall creating a synchronized show. FIG. 66 illustrates a second EACB 196 reflecting second image bearing surface 200 from a second video display 202. The entire display system as seen in FIG. 66 can be synchronized to create a complete show event and more video displays and EACBs can be included (not shown). FIG. 67 illustrates a multi-sectioned EACB 204 that has more than one section of general electronically adjustable contrast layer 30 so that many segments can be controlled independently and optionally synchronized to create a show event. An EACB segment 205 is controlled independently of others segments which allows certain sections of the reflected image 34 to be in a darkened state, transparent state, and in a state between.

Since the EACB 32 has a transparent state, the background 2 can, in another embodiment, have added to it other video displays to create multi-layered video effects which can all be coordinated and synchronized to create a presentation along with the EACB 32 darkened, transparent, and between states. FIG. 68 illustrates the use of generic rear display 208 with screen 210 that is visible through the EACB 32. A placement 206 from the reflected image 34 orients the images separate creating a multi-layer video effect. FIG. 69 illustrates the use of front projection screen 171 (flat or dimensional) placed at the backside of the EACB 32 and seen through the EACB 32. FIG. 70 illustrates the specialized 3-D display 182 with the optional 3-D enhancement layer 184. FIG. 71 illustrates the dimensional rear projection screen 178 and may be a flat rear screen as well (not shown). FIG. 72 illustrates a rear signage 218 which can include any type of signage, including, but not limited to back lit signs and light effect systems which may be synchronized with the EACB 32. FIG. 73 illustrates the spatial image 176 created by lens 174 projected through the EACB 32. Multiple lenses, one or more curved mirrors, and any combination may be used to produce the spatial image 176. The spatial image 176 is produced by a rearward display 221 and a rearward screen 222 and reflected optionally upon a reflection mirror 220. Still another configuration includes multiple reflected images as seen in FIG. 74. Reflected image 232 originates from a second rear video display 226 and a third reflected image 234 originates from a third rear video display 230. An observer can see at one time 3 reflected images (34, 232, and 234) each interacting with coordinated video content and various states of darkened, transparent, and between.

Figure 75:
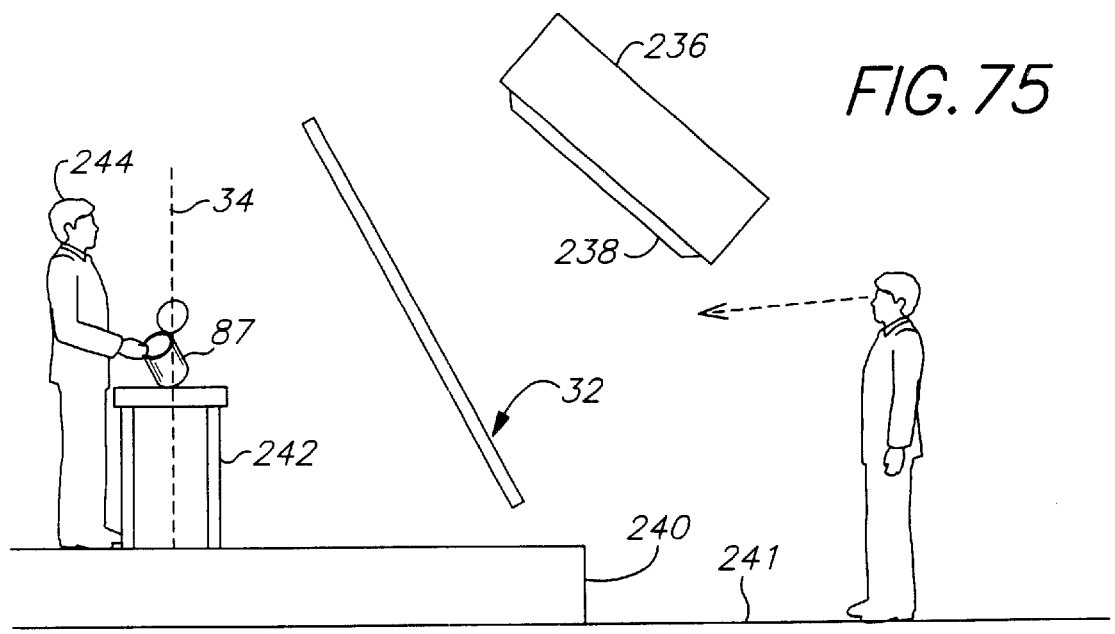
FIG. 75 illustrates the EACB utilized in conjunction with a live actor and props on a stage.
Figure 76:
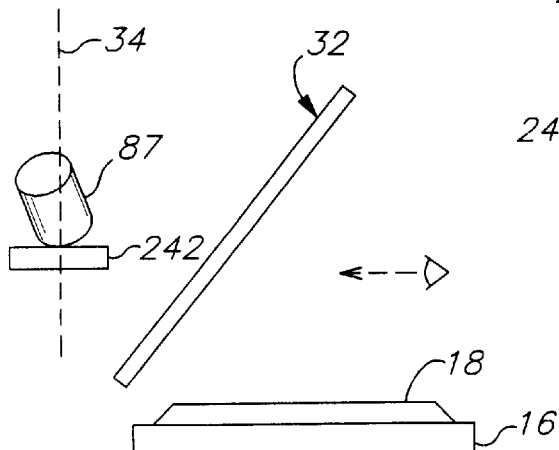
FIG. 76 illustrates the EACB utilized with a prop.
Figure 77:
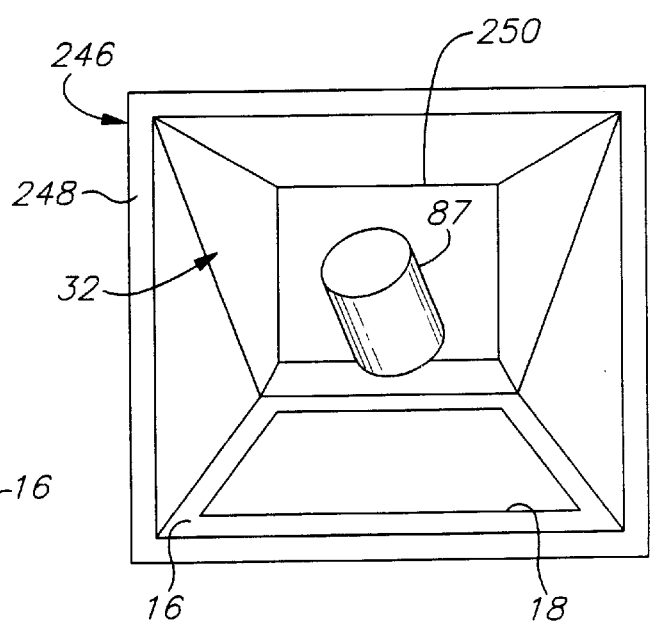
FIG. 77 illustrates the EACB utilized with a housing that surrounds the reflected image.

Another embodiment of the present invention, as seen in FIG. 75, is to align the reflected image 34 and the reflected video object 87 with a prop 242 and a live actor 244 for the creation of theatrical effects. A large screen 238, produced by a large display 236, can create impressively a large reflected video object 87 or display full screen video or film. A stage 240 is shown as one possible configuration of the present invention used as a theatrical effect. On a smaller scale FIG. 76 illustrates the reflected video object resting on a prop shelf 242. The special effects producer will appreciate the various creative productions that can be achieved, such as people walking across the stage and then disappearing since they are only a reflection of a film or video image. Or tiny characters that can interact with miniature sets. The EACB 32 offers in both the configurations of FIGS. 75 and 76 the ability to display video and even film with full contrast when the EACB 32 is in the darkened mode, so stage lighting and prop lighting need not be dimmed. FIG. 77 illustrates an enclosed box effect so that the reflected video object 87 appears to float inside the box 246 and a rear of the box 250 serves as a reference plane so that the reflected video object appears to float in front of. The box 246 need not be a box but any housing shape that can contain the reflected video object. To further enhance the effect, the box walls can be illuminated or detailed with fiber optic strands creating a grid to further create the illusion the reflected video object is floating inside the cavity of the box 246. The EACB 32 can change to a darkened state to present full screen video unencumbered by the ambient light within the box.

An additional embodiment of the present invention is seen in FIG. 78. A single stiff hinge 252 connected by a rod 254 and attached to the display 16 is seen with the EACB 32 folded down upon the image bearing screen 18. The observer with this arrangement can see through the EACB 32 and view the image bearing screen 18. An optional anti-reflection rear layer may be added to reduce reflections that may occur as a result of a metallic beamsplitter coating on the EACB 32 that faces the image bearing screen 18. This configuration is ideal for a plasma panel display that can be hung and used for direct viewing, as illustrated, and then laid on its back with the EACB 32 lifted to a 45 degree angle for reflected viewing (not shown). An additional telescoping stand can be used with this configuration in which the display 16 is hinged (not shown). The telescoping stand would permit the display to be used on a desktop with roughly a 15" liquid crystal display so that the observer can select between a direct view and a reflected view mode. A "video inversion" (right to left mirror reversal & inversion) button 256 is also included so that the image can be quickly adapted from direct view mode to reflected view mode. No matter the application or the type of display the functional aspects of a direct view mode and reflected view mode offers considerable options to those skilled in the art to create multi-use products.

FIGS. 79 illustrates a desktop display that is hinged to a dual hinge 260 that connects to a convertible display 261 and a hinge section 265 that attaches to the EACB 32. The entire display is connected to a stand 258. The image bearing screen 263 is convertible either by being viewed from the back side as seen in FIG. 80 with a rear side screen 262 or is deactivated and the rear side screen 262 is a second display. As seen in FIG. 80 the EACB and the convertible display 261 can fold up which permits both a reflected view mode (FIG. 79) and a direct view mode. The present configuration is helpful when additional desktop space is needed and the EACB 32 and its states are not in use.

Figure 81:
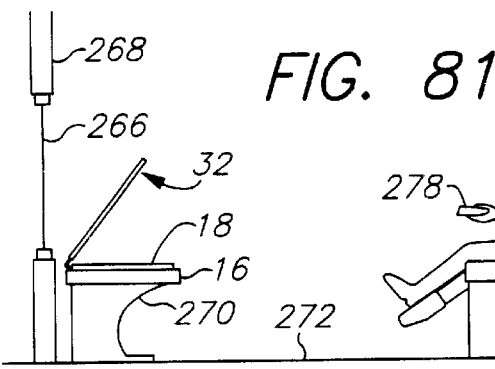
FIG. 81 illustrates the EACB utilized in a consumer television.
Figure 82:
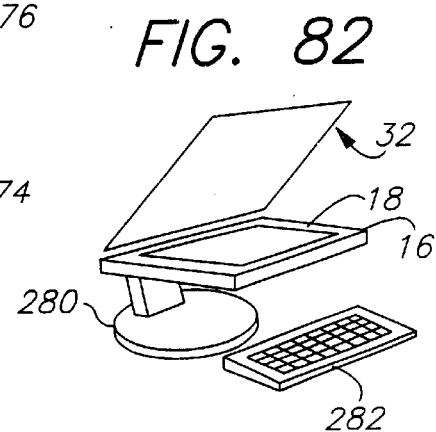
FIG. 82 illustrates the EACB utilized in a computer monitor.
Figure 83:
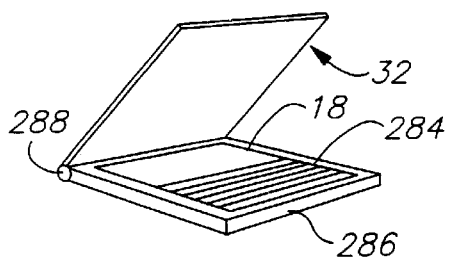
FIG. 83 illustrates the EACB utilized in a portable computer.
Figure 84:
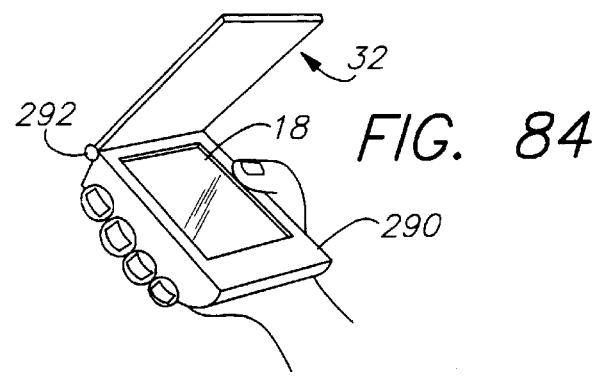
FIG. 84 illustrates the EACB utilized in a handheld device.
Figure 85:
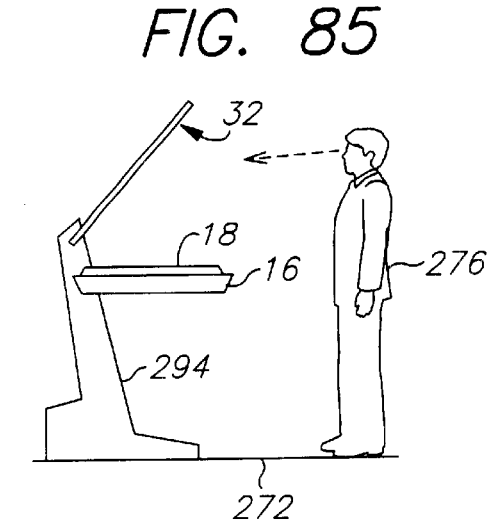
FIG. 85 illustrates the EACB utilized in a public venue display such as a kiosk video game, or gambling device.
Figure 86:
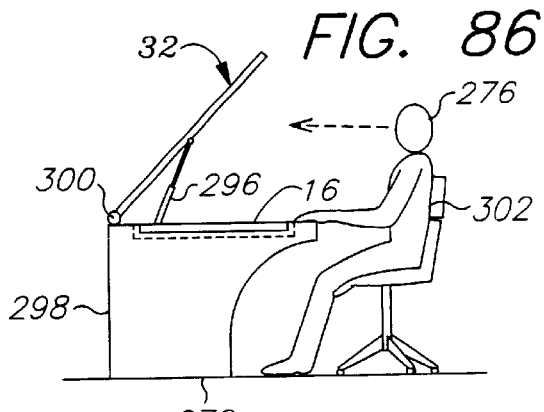
FIG. 86 illustrates the EACB utilized as a part of a folding table.
Figure 87:
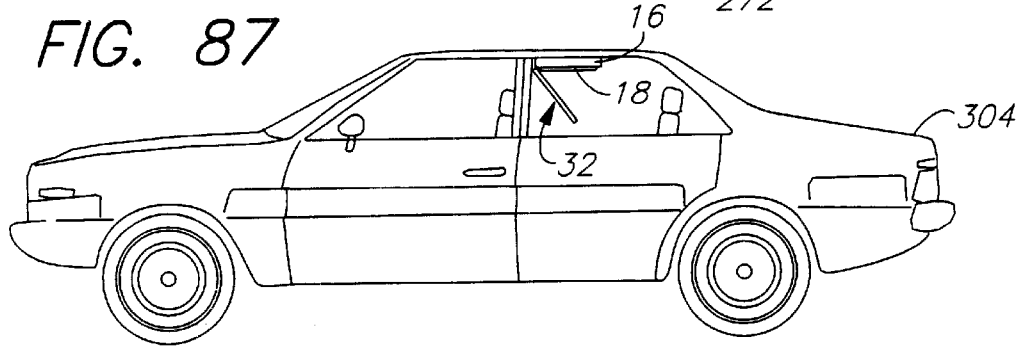
FIG. 87 illustrates the EACB utilized as a display for a vehicle.

The present invention can be incorporated into a variety of products of which FIGS. 81 through 87 are examples. FIG. 81 illustrates the video display 16 and the EACB 32 above a stand 270 on a floor 272 for a user 276, seated upon a leather throne 274, to see through both the EACB 32 and a house window 266. An EACB remote control 278 permits the user 278 to control television programming and the EACB 32 with the least amount of physical effort. FIG. 82 illustrates the present invention configured as a desktop computer display built upon a stand 280 so that the display 16 forms a canopy above the desktop permitting increased useable desktop area A computer keyboard 282 is illustrated for reference. FIG. 83 illustrates a notebook computer 286 with built-in computer display 18 and built-in keyboard 284. The EACB 32 is hinged by tiny stiff hinges 288 which permit the EACB 32 to close and open to the appropriate viewing position. FIG. 84 illustrates image bearing screen 18 built integral to a handheld portable device, such as a PDA, cell phone, video phone, etc. The EACB 32 folds down upon the handheld portable device by micro stiff hinge 292. Still another configuration is seen in FIG. 85 where a slant stand positions the EACB 32 and the video display at a height from the floor 272 so that the device can be used as a kiosk, a video game platform, and other public venue applications. FIG. 86 illustrates a desk system in which the EACB 32 is lowered onto the video display 16 positioned in desk stand 298. The EACB is hinged by free hinge 300 and is raised in place by gas spring 296. The user 276 is seated on a swivel chair 302. FIG. 87 illustrates a vehicle with the display 16 and EACB 32 can be seen by a rear passenger (not shown). The passenger can control the EACB to view through the EACB 32 and can change to the darkened state for viewing high contrast video.

FIG. 88 illustrates the use of a display mounted electronically adjustable contrast layer 308 with voltage feed line 306. The layer 308 permits a user to select various degrees of neutral density tint to increase the contrast of the image bearing surface 18. A novel invention is seen in FIG. 89 where a generic electronically adjustable contrast layer 310 is deployed behind a liquid crystal display 10 with a see-through screen 12 so that the states of transparent, darkened, and between can be selected or synchronized with video content. The functional aspects of the generic electronically adjustable contrast layer 310 in conjunction with the liquid crystal display 10 should be understood as possessing the same functional features set forth in this document as presented for the EACB 32 in conjunction with the video display 16 wherever applicable. Likewise, the prior art is further improved with the addition of the generic electronically adjustable contrast layer 310 positioned in front of the rear projection holographic screen 4 (FIG. 90) and positioned behind the front projection holographic screen 8 (FIG. 91). Electric feed line 311 sends the appropriate applied voltage to the holographic screens 4 and 8. The holographic screens 4 and 8 in conjunction with the generic electronically adjustable contrast layer 310 should be understood as possessing the same functional features set forth in this document as presented for the EACB 32 in conjunction with the video display 16 wherever applicable.

Figure 92:
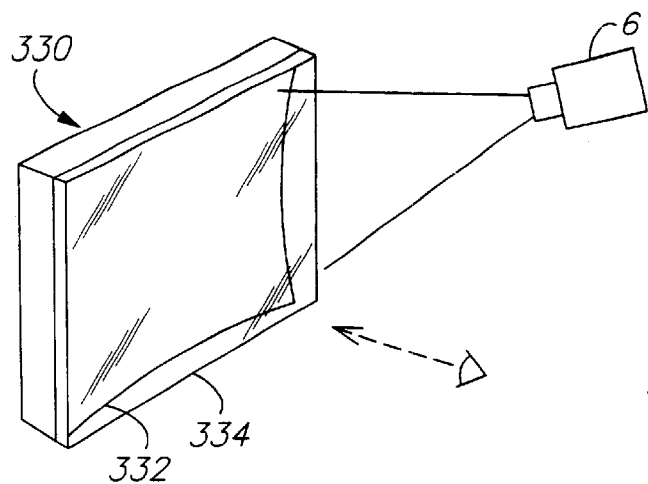
FIG. 92 illustrates a curved high-gain projection screen with an anti-reflective contrast layer.
Figure 93:
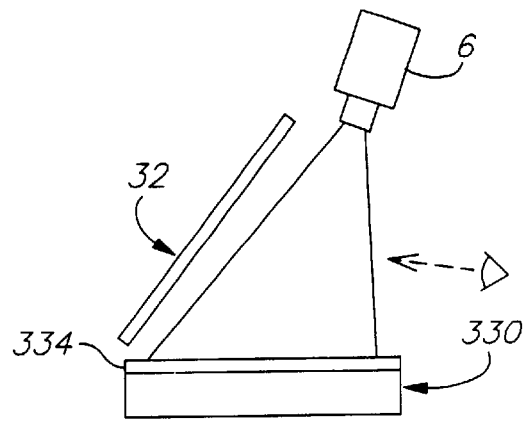
FIG. 93 illustrates the projection device of FIG. 92 used in conjunction with an EACB.
Figure 94:
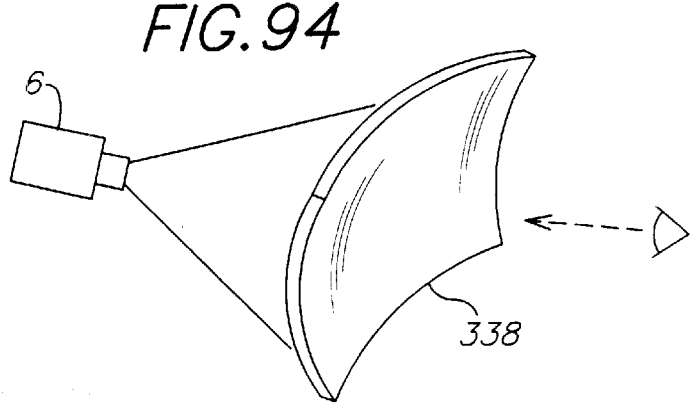
FIG. 94 illustrates a curved rear projection screen for increased brightness.

Another novel invention is an ultra high gain curved silvered front projection screen 332 that is contained in screen box 330 and partially concealed behind an antireflective neutral density glass 334 that permits a front projection beam to pass through. The antireflective neutral density glass 334 adds contrast to the image upon the curved silvered front projection screen 332 and partially conceals the curves of the screen. Coatings can be optimized so that there are greater neutral density characteristics in one direction and less from another. Optimally, the projection beam passes through the antireflective neutral density glass 334 at the direction with the least amount of neutral density tint (clear) and the image is viewed at the direction with the most neutral density tint. FIG. 93 illustrates the projection system of FIG. 92 positioned for use with the EACB 32. FIG. 94 illustrates the use of a novel curved rear projection screen which increases brightness within a specific cone of viewing. Antireflective and neutral density filters can as well be added to the front of the curved rear projection screen to increase contrast and partially conceal the curves of the screen.

Figure 95:
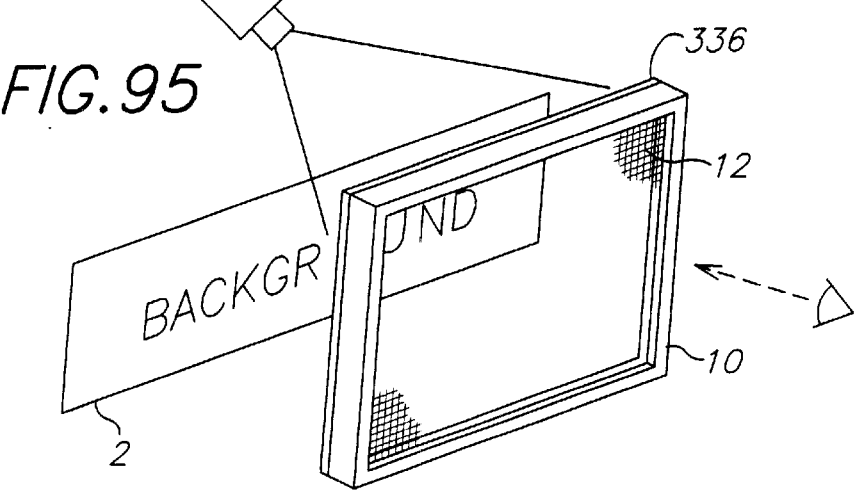
FIG. 95 illustrates a transparent LCD display with a backlight projected from a distance upon a transparent/diffused substrate.

FIG. 95 illustrates another novel invention which is the use of the liquid crystal display 10 with a light absorbing translucent layer 336 positioned behind. The light absorbing translucent layer 336 receives white light from a spot light 335 mounted at a distance and behind the layer 336. The layer 336 absorbs sufficient light to illuminate the color light valves built into the see-through screen 12. The layer 336 is also sufficiently transparent so that an observer can see through to the background 2. The layer 336 is custom fabricated from tiny holographic prisms so that light may be directed through the tiny prisms to the see-through screen 12 (not shown). The tiny prisms are also transparent so that an observer can see through to the back side. A lens with micro lenses may as well achieve the same functional requirements.

Figure 96:
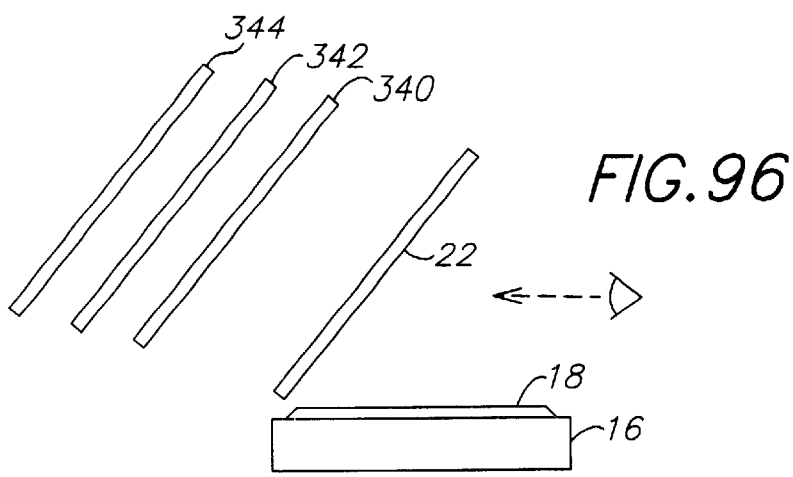
FIG. 96 illustrates adjustable contrast layers to be selected and utilized based upon the ambient light of the environment.
Figure 97:
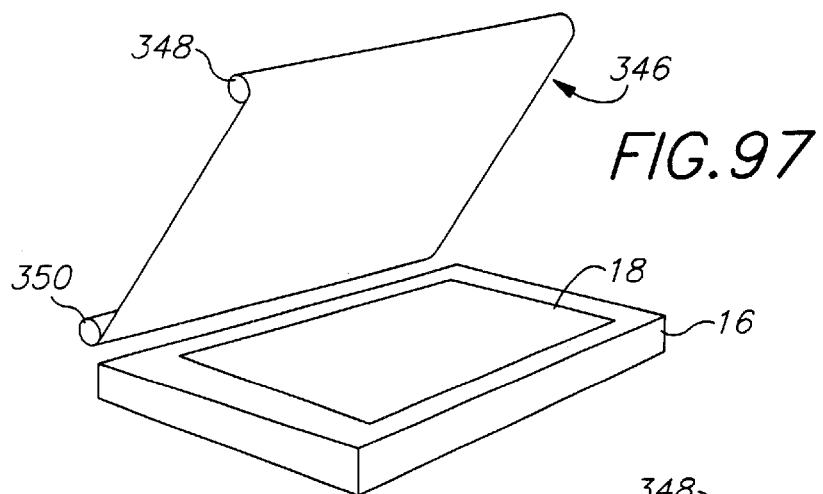
FIG. 97 illustrates a mechanical rolling system that can alter the contrast of the reflected image by changing various contrast filters.
Figure 98:
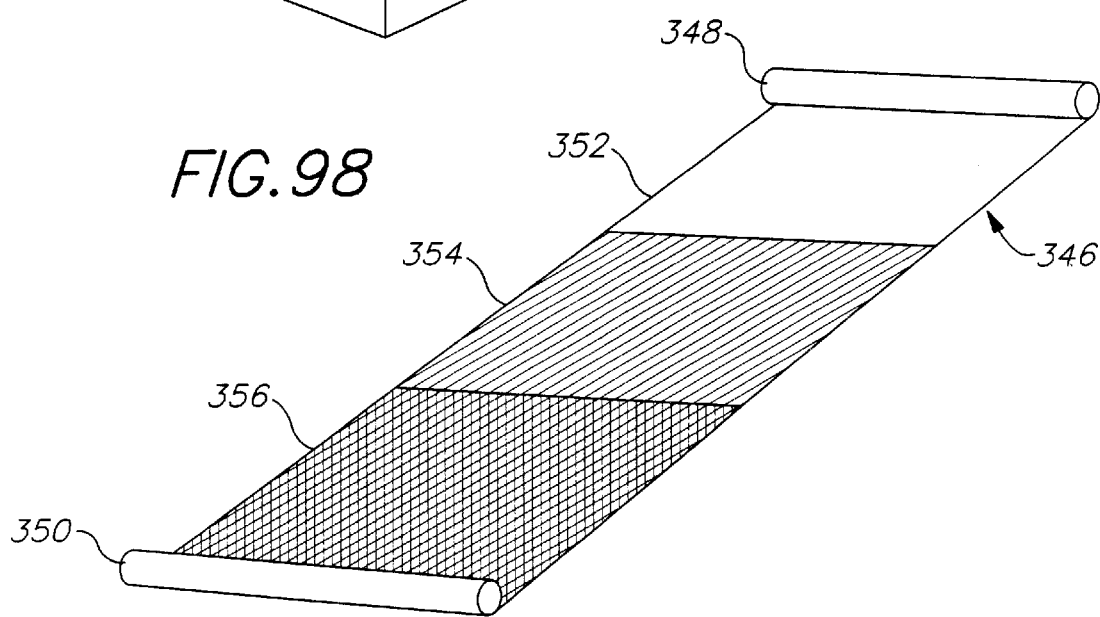
FIG. 98 illustrates the contrast filter segments of a reflective roll.

Another embodiment is to provide a reflected display with transparent properties a method of adjusting the contrast without the use of the EACB 32. FIG. 96 illustrates the beamsplitter 22 reflecting the image bearing screen 18. Dependent upon the ambient light conditions of the background 2 (not shown in this figure) various neutral density filters with differing values of "smoke colored" tint are added and combined to create an adjustable contrast layer. The beamsplitter 22 is relatively transparent. With the addition of a 20% value filter 340 positioned behind the beamsplitter 22 the reflected image 34 appears darker and with more contrast (not shown in this figure). Likewise, another 20% value filter 342 and a 80% value filter 344 substantially darken the beamsplitter 22. A mechanical roller 348 and a second mechanical roller 350 contain a flexible multi-filter beamsplitter 346 as seen in FIG. 97. FIG. 98 illustrates the segments of a clear filter 352, a medium filter 354 (between transparent and darkened), and a dark filter 356 fabricated as a part of the flexible multi-filter beamsplitter 346. The flexible multi-filter beamsplitter 346 in conjunction with display 16 should be understood as possessing the same functional features set forth in this document as presented for the EACB 32 in conjunction with the video display 16 wherever applicable. For one example, the mechanical rollers are engaged to position a particular filter for viewing and that particular filter is synchronized with the video content.

Figure 99:
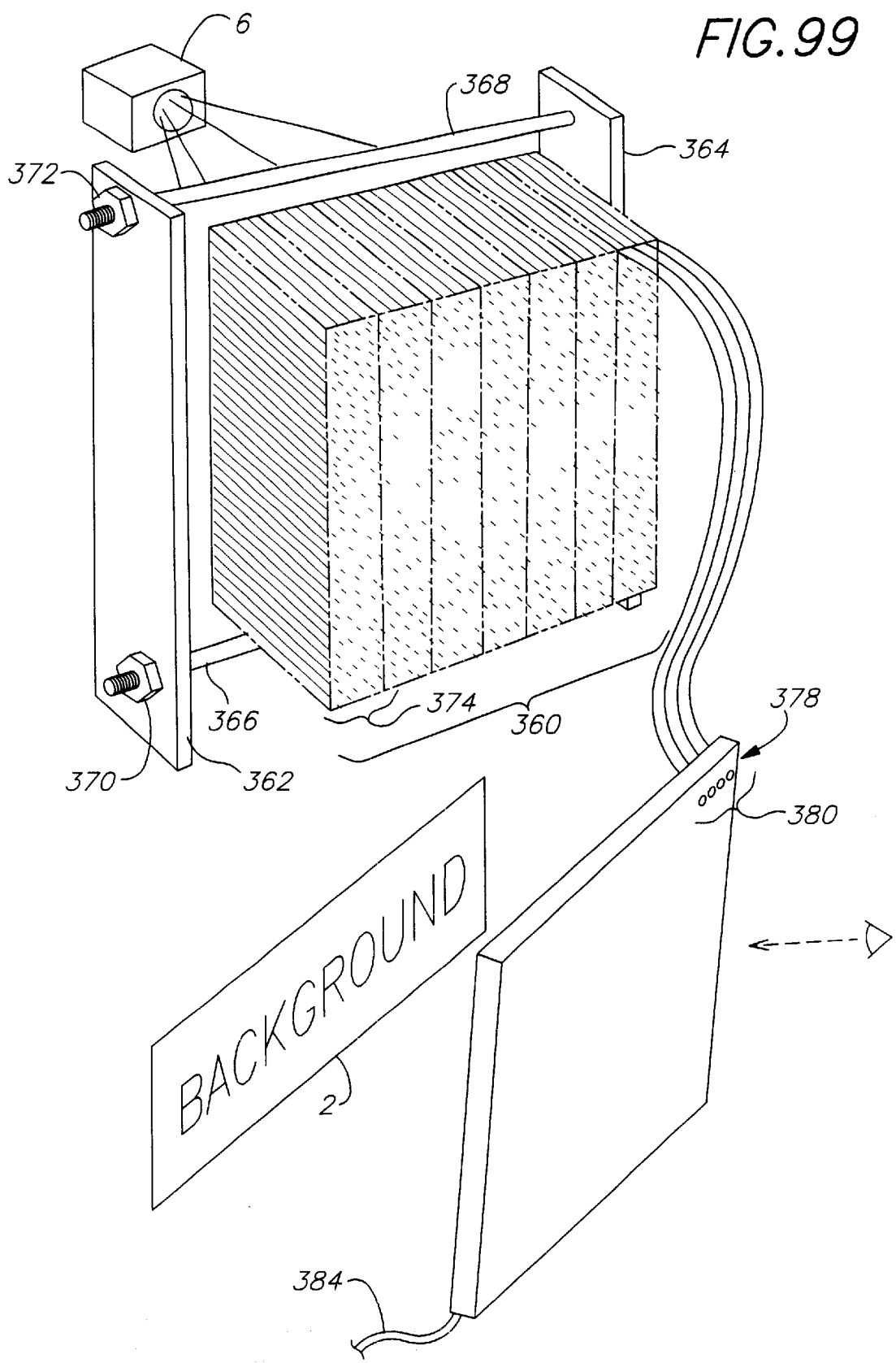
FIG. 99 illustrates a fiber optic block constructed into segments and utilized with electronically adjustable contrast layers.

FIG. 99 illustrates novel invention that improves upon fiber optic displays. A fiber optic block 360 is fabricated into fused segments, such as a first segment 374. The segments are clamped together a first plate 364 and a second plate 362 connected by a first rod 368 and a second rod 366 and held by a first bolt 370 and a second bolt 372. The advantage of the present segmented system is that if any part of the block 360 and the extended fiber optic strands are damaged only a segment, such as the segment 374, can be removed and replaced. Given the extreme labor in creating fiber optic displays by hand which involve positioning up to 250,000 strands the segmented block is a superior fabrication technique and an improvement in the art than having one single fused block.

The projector in FIG. 99 is aimed at a side of the fiber optic block 360 and each fiber optic strand in the block corresponds to the same placement on the display side. As is commonly done the fiber optic strands are inserted into wholes of a rigid black substrate. A novel substrate would consist of an electronically adjustable substrate 378 that can alter from transparent to darkened. In transparent mode the strands would be seen but the effect could be used to allow sunlight into a building and also be used for other unique applications. The strands are placed by hand or by machine into holes as seen in a hole section 380.

Figure 100:
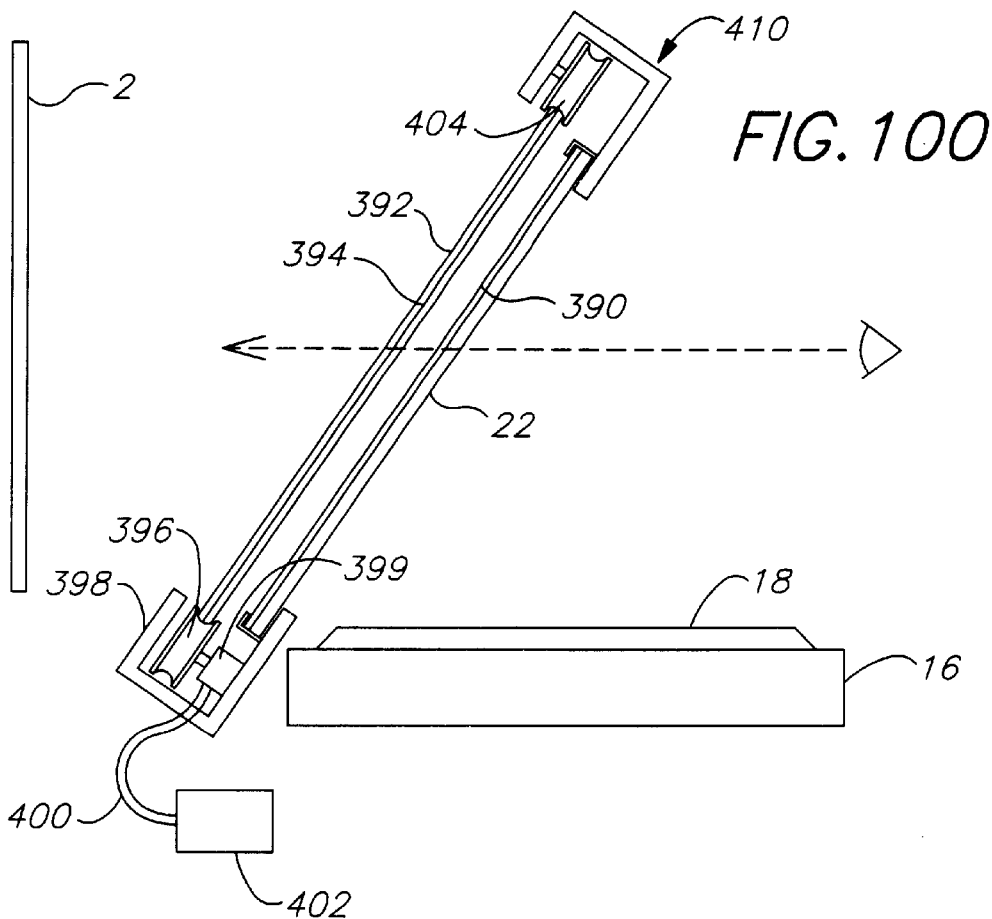
Figure 101:
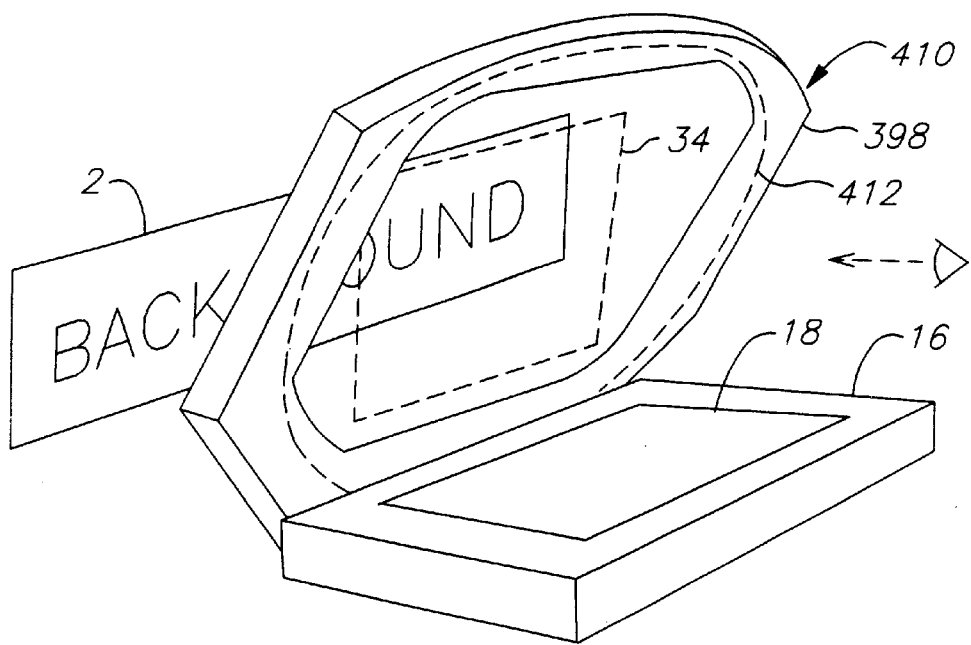
FIG. 101 illustrates a perspective view of the configuration illustrated in FIG. 100.

Another embodiment of the present invention is seen in FIGS. 100 and 101 illustrating an automated adjustable dual polarizer system 410. Rather than an EACB 32 the use in the present invention of a first altering polarizer 392 and a second altering polarizer 390 are automatically and mechanically altered in their relationship to one another to create the states of transparent, darkened and the state of increments between. The polarizers 390 and 392 are linear polarizers that are realigned roughly in a rotational movement of 90 degrees allowing the transparent, darkened and between states to be realized. The rotational movement is mechanically preformed by attaching the first altering polarizer 392 to a round glass plate 394 forming an integral component. The round glass plate 394 is held in place by a rolling sleeve 404 and additional rolling sleeves around the perimeter for stabilization (not shown). A rubber rolling sleeve 398 attached to a motor 399 provides mechanical motion to the round glass plate 394 and thereby adjusts the direction of the polarizer 392. The second altering polarizer 390 remains stationary and is attached to the beamsplitter 22. The entire automated adjustable dual polarizer system 410 is held in place by frame 398. As seen in FIG. 101 the travel area 412 of the round glass plate 394 with the attached first altering polarizer 390 fits within the frame 398.

The functional aspects of the automated adjustable dual polarizer system 410 should be understood as possessing the same functional features set forth in this document as presented for the EACB 32 in conjunction with the video display 16 wherever applicable. While the EACB 32 can be defined as solid state the automated adjustable dual polarizer 410 is a mechanical moving device initiated by applied voltage over lead line 400 to the motor 390. The applied voltage is regulated by automated system control box 402 which adjusts applied voltage to the motor 390 in either direction, at any given speed, and any given travel distance desired and controlled real time by an operator or programmed to operate independently. Most significantly, as described for the EACB 32 functionality, the same is applicable in regards to synchronizing the states of transparent, darkened, and between with events of video content creating a compelling video presentation. The mechanical function of a rotating round glass plate 394 as illustrated can certainly utilize other mechanical methods of reorienting two or more polarizers to achieve the same inventive parameters. More exotic polarizers such as circular polarizers, patterned polarizers and so on may additionally allow other mechanical movements to reorient polarizers to achieve the states of transparent, darkened, and increments between. Patterned polarizers can be constructed in alternating strips in the same substrate and two of these substrates laid upon one another will enable the entire mechanical motion to be less than one inch depending upon the width of the strips (all not shown). Two micro-louver louver layers laid upon one another, such as those made by 3M Inc., as well, can be used in place of the polarizers in system 410 which are shifted so that in one position the louvers are aligned forming a transparent state and in another automated mechanically positioned placement the louvers are not aligned between the layers forming a darkened state (not shown). Increments between transparent and darkened are achieved by positioning the louvers of the layers between the aligned and not aligned louver positions.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

We claim:

1. An adjustable contrast transparent display system for displaying video content that allows a background to be visible through the display system wherein the display system is alterable to reduce and increase contrast of a reflected image, the display system comprising:
   an image display with an image bearing surface for displaying video content;
   a semireflective transparent panel disposed at an angle of between zero and 90 degrees to the image bearing surface positioned so an observer can see a reflection of the image bearing surface from the semireflective transparent panel; and
   an electronically adjustable contrast layer disposed between the semireflective transparent panel and a background on a side of the panel opposite the observer, the layer being adjustable to one of a plurality of states ranging from a transparent state wherein light is transmitted through the layer from the background to a darkened state wherein the transmission of light from the background is diminished thereby alternately reducing and increasing contrast of the reflection of the image bearing surface.

2. An adjustable contrast transparent display system for displaying video content that allows a background to be visible through the display system wherein the display system is alterable to reduce and increase contrast of a reflected image, the display system comprising:
   an image display with an image bearing surface for displaying video content;
   a semireflective transparent panel disposed at an angle of between zero and 90 degrees to the image bearing surface positioned so an observer can see a reflection of the image bearing surface from the semireflective transparent panel; and
   an electronically adjustable contrast layer disposed between the semireflective transparent panel and a background on a side of the panel opposite the observer, the layer being adjustable between two states, a transparent state wherein light is transmitted through the layer from the background to a darkened state wherein the transmission of light from the background is diminished thereby alternately reducing and increasing contrast of the reflection of the image bearing surface.

3. An adjustable contrast transparent display system for displaying video content that allows a background to be visible through the display system wherein the display system is alterable to reduce and increase contrast of a reflected image, the display system comprising:
   an image display with an image bearing surface for displaying video content;
   a semireflective transparent panel disposed at an angle of between zero and 90 degrees to the image bearing surface positioned so an observer can see a reflection of the image bearing surface from the semireflective transparent panel; and
   an electronically adjustable contrast layer disposed between the semireflective transparent panel and a background on a side of the panel opposite the observer, the layer being adjustable in selected increments to one of a plurality of states ranging from a transparent state wherein light is transmitted through the layer from the background to a darkened state wherein the transmission of light from the background is diminished, thereby incrementally reducing and increasing contrast of the reflection of the image bearing surface.

4. An adjustable contrast transparent display system for displaying video content that allows a background to be visible through the display system wherein the display system is alterable to reduce and increase contrast of a reflected image, the display system comprising:
   an image display with an image bearing surface for displaying video content;
   a semireflective transparent panel disposed at an angle of between zero and 90 degrees to the image bearing surface positioned so an observer can see a reflection of the image bearing surface from the semireflective transparent panel; and an electronically adjustable suspended particle device contrast layer disposed between the semireflective transparent panel and a background on a side of the panel opposite the observer, the layer being adjustable between two states, a transparent state wherein light is transmitted through the layer from the background to a darkened state wherein the transmission of light from the background is diminished, thereby alternately reducing and increasing contrast of the reflection of the image bearing surface.

5. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface positioned so an observer can see a reflection of the image bearing surface from the semireflective transparent panel; and an electronically adjustable suspended particle device contrast layer disposed between the semireflective transparent panel and a background on a side of the panel opposite the observer, the layer being adjustable in selected increments to one of a plurality of states ranging from a transparent state wherein light is transmitted through the layer from the background to a darkened state wherein the transmission of light from the background is diminished, thereby incrementally reducing and increasing contrast of the reflection of the image bearing surface.

6. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface positioned so an observer can see a reflection of the image bearing surface from the semireflective transparent panel;

an electronically adjustable contrast layer disposed between the semireflective transparent panel and a background on a side of the panel opposite the observer, the layer being adjustable to one of a plurality of states ranging from a transparent state wherein light is transmitted through the layer from the background to a darkened state wherein the transmission of light from the background is diminished thereby alternately reducing and increasing contrast of the reflection of the image bearing surface; and synchronization means for synchronizing adjustments of the electronically adjustable contrast layer with events in the video content.

7. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface positioned so an observer can see a reflection of the image bearing surface from the semireflective transparent panel;

an electronically adjustable contrast layer disposed between the semireflective transparent panel and a background on a side of the panel opposite the observer, the layer being adjustable between two states, a transparent state wherein light is transmitted through the layer from the background and a darkened state wherein the transmission of light from the background is diminished, thereby alternately reducing and increasing contrast of the reflection of the image bearing surface; and synchronization means for synchronizing adjustments of the electronically adjustable contrast layer with events in the video content.

8. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface positioned so an observer can see a reflection of the image bearing surface from the semireflective transparent panel;

an electronically adjustable contrast layer disposed between the semireflective transparent panel and a background on a side of the panel opposite the observer, the layer being adjustable in selected increments to one of a plurality of states ranging from a transparent state wherein light is transmitted through the layer from the background to a darkened state wherein the transmission of light from the background is diminished, thereby incrementally reducing and increasing contrast of the reflection of the image bearing surface; and synchronization means for synchronizing adjustments of the electronically adjustable contrast layer with events in the video content.

9. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel;

an electronically adjustable suspended particle device contrast layer disposed between the semireflective transparent panel and a background on a side of the panel opposite the observer, the layer being adjustable between two states, a transparent state wherein light is transmitted through the layer from the background and a darkened state wherein the transmission of light from the background is diminished, thereby alternately reducing and increasing contrast of the reflection of the image bearing surface; and synchronization means for synchronizing adjustments of the electronically adjustable suspended particle device contrast layer with events in the video content.

10. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel;

an electronically adjustable suspended particle device contrast layer disposed between the semireflective transparent panel and a background on a side of the panel opposite the observer, the layer being adjustable in selected increments to one of a plurality of states ranging from a transparent state wherein light is transmitted through the layer from the background to a darkened state wherein the transmission of light from the background is diminished thereby incrementally reducing and increasing contrast of the reflection of the image bearing surface; and synchronization means for synchronizing adjustments of the electronically adjustable suspended particle device contrast layer with events in the video content.

11. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel;

an electronically adjustable contrast layer disposed between the semireflective transparent panel and a background on a side of the panel opposite the observer, the layer being adjustable to one of a plurality of states ranging from a transparent state wherein light is transmitted through the layer from the background to a darkened state wherein the transmission of light from the background is diminished, thereby alternately reducing and increasing contrast of the reflection of the image bearing surface; and an ambient light detection means for detecting an intensity of ambient light and automatically adjusting the electronically adjustable contrast layer in response to the detected intensity.

12. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel; and an adjustable contrast layer disposed between the semireflective transparent panel and a background on a side of the panel opposite the observer, the layer being adjustable to one of a plurality of states ranging from a transparent state wherein light is transmitted through the layer from the background to a darkened state wherein the transmission of light from the background is diminished thereby reducing and increasing contrast of the reflection of the image bearing surface.

13. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel; and an automated adjustable dual polarizer system disposed between the semireflective transparent panel and a background on a side of the panel opposite the observer, the system being adjustable to one of a plurality of states ranging from a transparent state wherein light is transmitted through the system from the background to a darkened state wherein the transmission of light from the background is diminished thereby reducing and increasing contrast of the reflection of the image bearing surface.

14. An adjustable contrast transparent display system for displaying video content that allows a background to be visible through the display system wherein the display system is alterable to reduce and increase contrast of a reflected image, the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel;

an automated adjustable dual polarizer system disposed between the semireflective transparent panel and a background on a side of the panel opposite the observer, the system being adjustable to one of a plurality of states ranging from a transparent state wherein light is transmitted through the system from the background to a darkened state wherein the transmission of light from the background is diminished thereby reducing and increasing contrast of the reflection of the image bearing surface; and synchronization means for synchronizing adjustments of the adjustable dual polarizer system with events in the video content.

15. A transparent display device for displaying video content that allows a background to be visible through the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel; and a layer of image blocking film comprised of microlouvers disposed on the image bearing surface allowing the image bearing surface to be reflected by the semireflective transparent panel while blocking a direct view of the image bearing surface from the observer.

16. A transparent display device for displaying video content that allows a background to be visible through the display system comprising:

an image production device with a visible image for displaying video content;

a semireflective transparent panel disposed at an angle of between zero and 90 degrees to the image bearing surface, positioned so an observer can see a reflection of the image bearing surface from the semireflective transparent panel; and an image bearing surface in which forms the visible image, having a low vertical viewing angle allowing the visible image to be reflected by the semireflective panel while blocking a direct view of the visible image from the observer.

17. A transparent display device for displaying video content that allows a background to be visible through the display system comprising:

an image production device with a bezel framing an image bearing screen for displaying video content;

a semireflective transparent panel disposed at an angle of between zero and 90 degrees to the image bearing surface, positioned so an observer can see a reflection of the image bearing surface from the semireflective transparent panel; and a transparent substrate disposed on the image bearing screen and the bezel forming a continuous surface reflected by the semireflective transparent panel.

18. A transparent display device for displaying video content that allows a background to be visible through the display system comprising:

an image production device with an image bearing screen for displaying video content;

a semireflective transparent panel disposed at an angle of between zero and 90 degrees to the image bearing surface, positioned so an observer can see a reflection of the image bearing surface from the semireflective transparent panel; and an antireflective transparent substrate disposed on the image bearing screen for reducing reflections upon the image bearing screen and increasing the contrast of the image bearing screen.

19. A transparent display device for displaying video content that allows a background to be visible through the display system comprising:

an image production device with an image bearing screen for displaying video content;

a semireflective transparent panel disposed at an angle of between zero and 90 degrees to the image bearing surface, positioned so an observer can see a reflection of the image bearing surface from the semireflective transparent panel; and a transparent neutral density filter disposed on the image bearing screen for increasing the contrast of the image bearing screen.

20. A transparent display device for displaying video content that allows a background to be visible through the display system comprising:

an image display with an image bearing surface for displaying video content;

a semireflective transparent panel disposed at an angle of between zero and 90 degrees to the image bearing surface, positioned so an observer can see a reflection of the image bearing surface from the semireflective transparent panel; and a transparent neutral density filter layer disposed on the semireflective transparent panel for increasing the contrast and brightness of the reflection of the image bearing surface.

* * * * *